March 29, 1960 W. E. TRIEST 2,931,022
SPOT SEQUENTIAL CHARACTER GENERATOR
Filed June 16, 1954 13 Sheets-Sheet 3

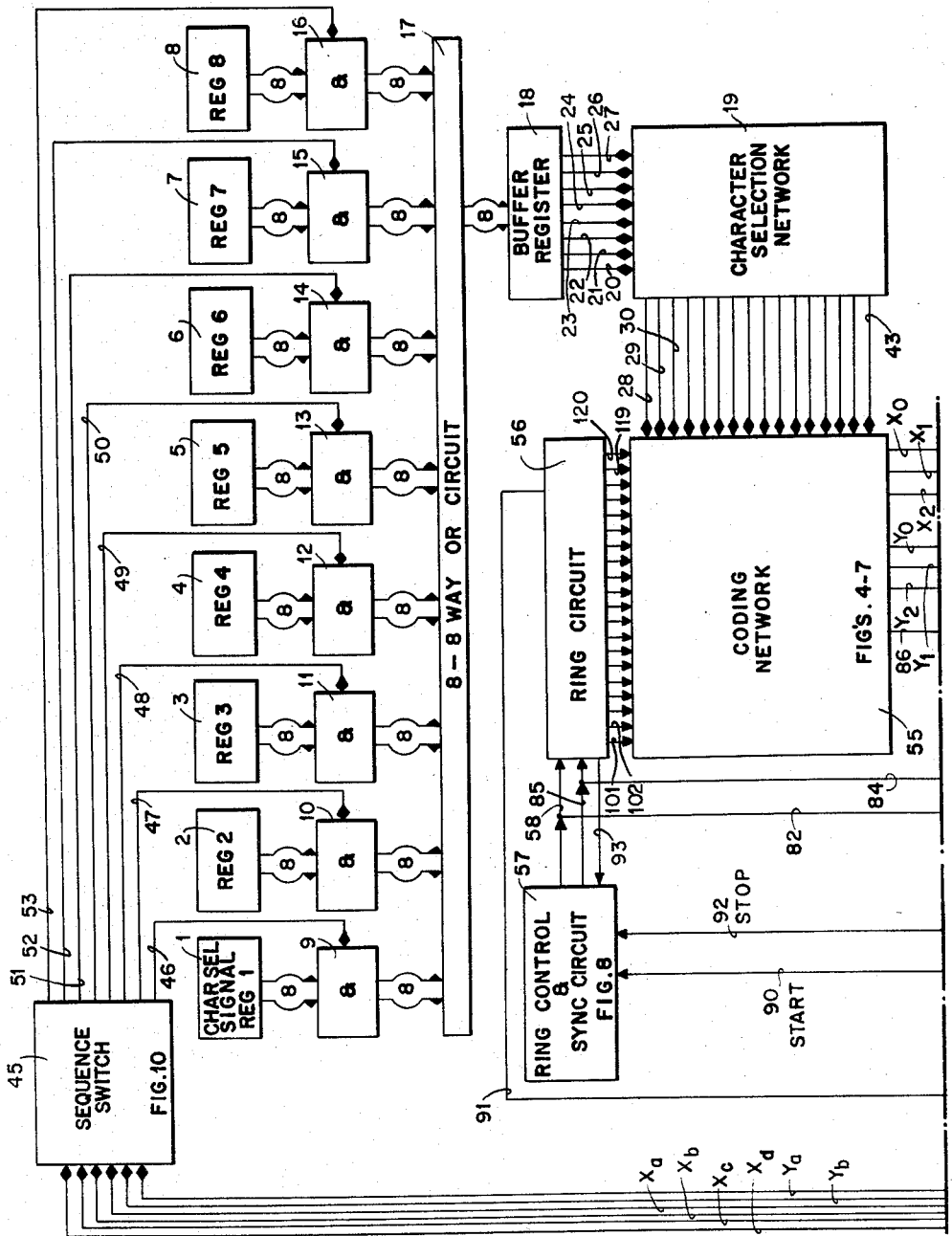

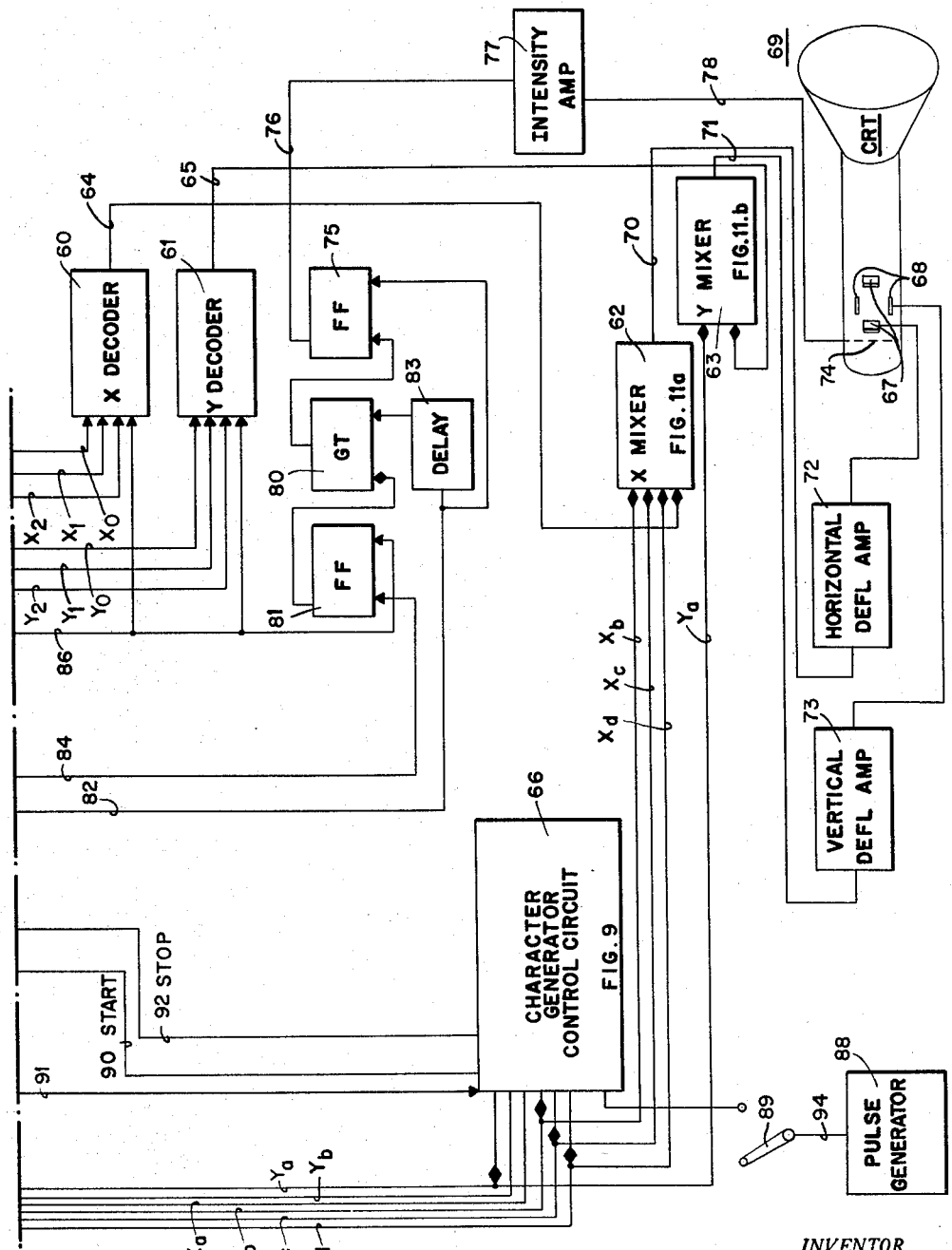

INVENTOR.
WILLIAM E TRIEST
BY
Theodore C. Wood
AGENT

INVENTOR.
WILLIAM E. TRIEST

March 29, 1960 W. E. TRIEST 2,931,022
SPOT SEQUENTIAL CHARACTER GENERATOR
Filed June 16, 1954 13 Sheets-Sheet 7

INVENTOR.
WILLIAM E. TRIEST
BY
Theodore C. Wood
AGENT

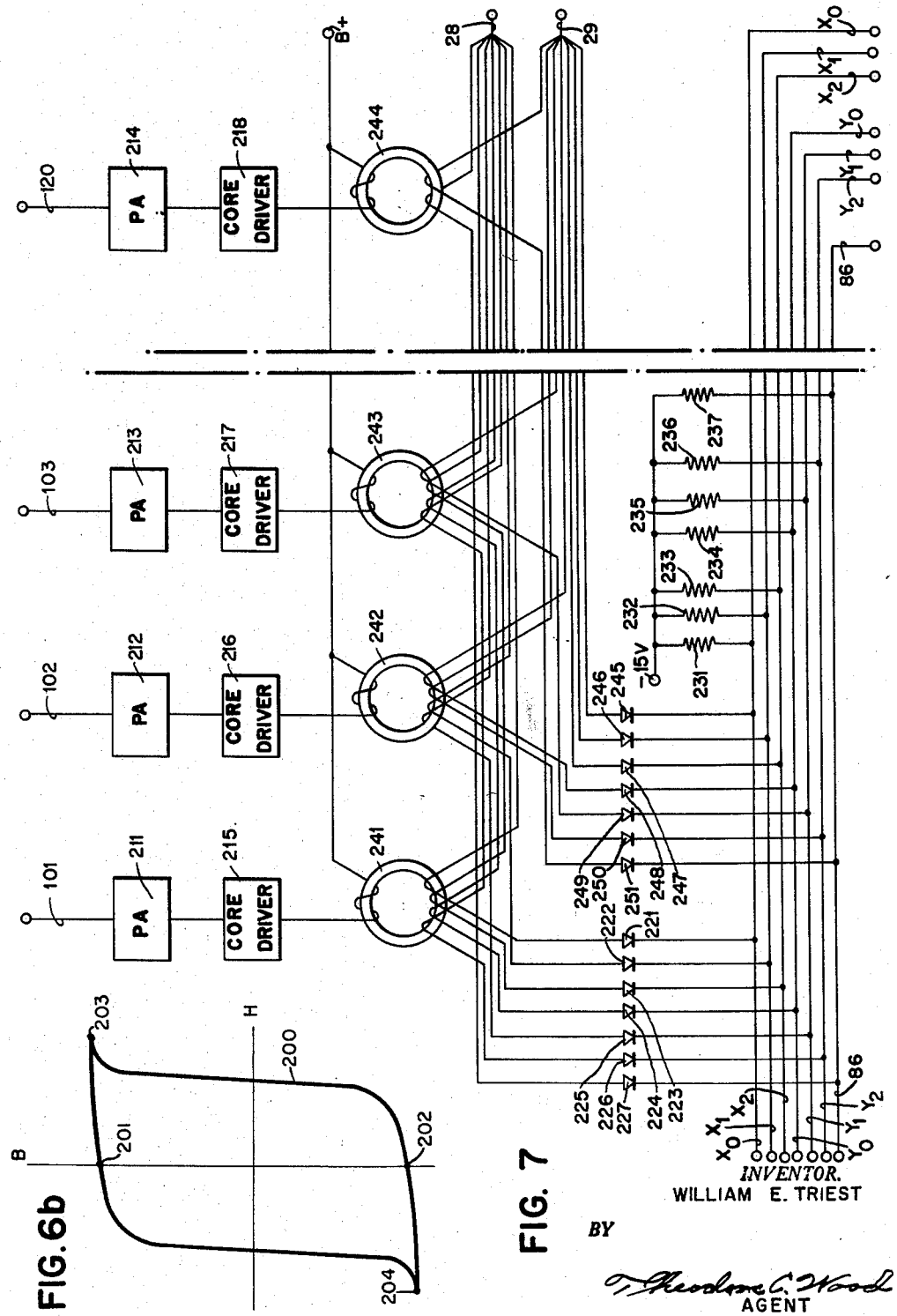

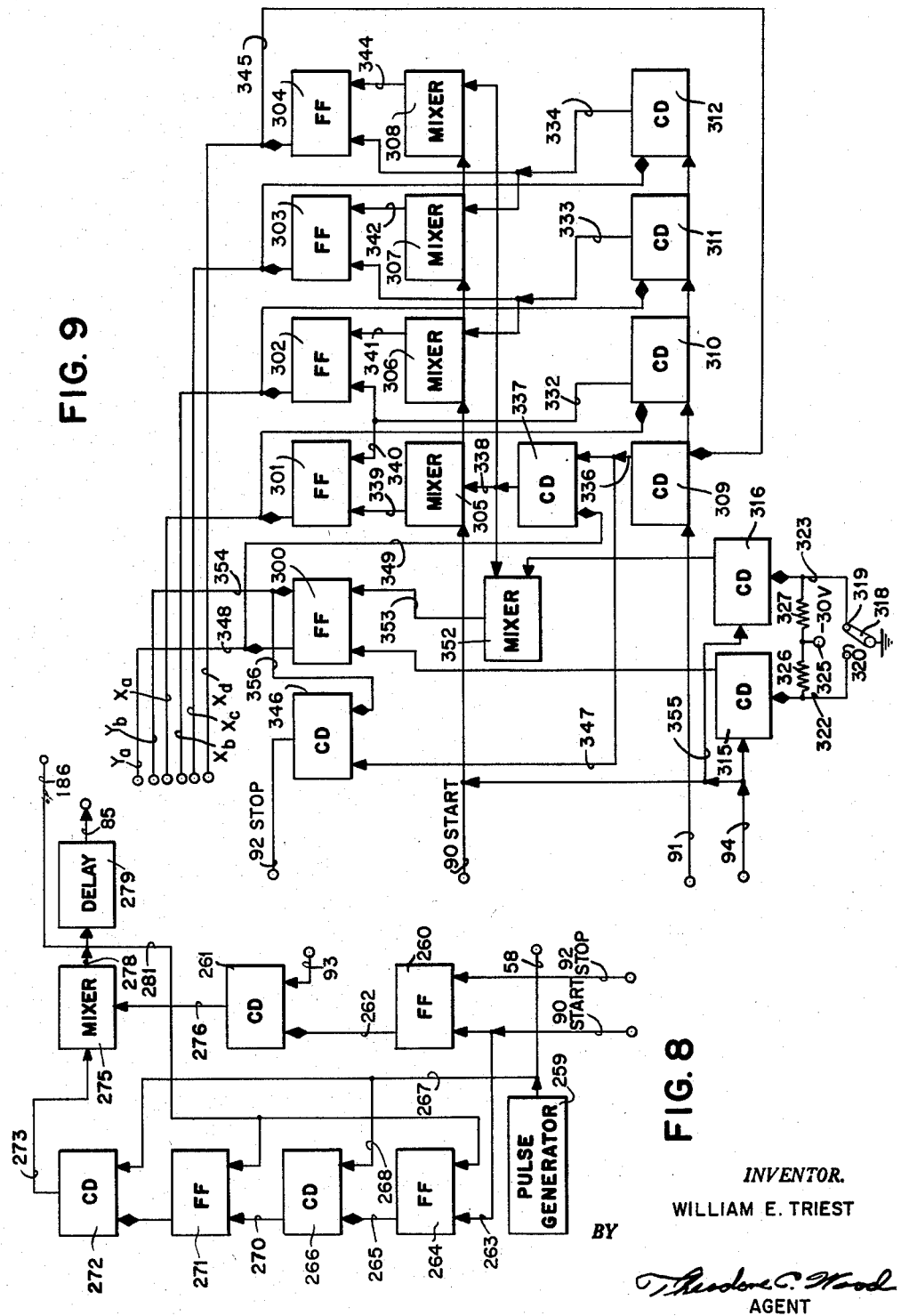

March 29, 1960 W. E. TRIEST 2,931,022
SPOT SEQUENTIAL CHARACTER GENERATOR
Filed June 16, 1954 13 Sheets-Sheet 10

INVENTOR.
WILLIAM E. TRIEST
BY
Theodore C. Wood
AGENT

March 29, 1960  W. E. TRIEST  2,931,022
SPOT SEQUENTIAL CHARACTER GENERATOR
Filed June 16, 1954  13 Sheets-Sheet 11

INVENTOR.
WILLIAM E TRIEST
BY
Theodore C. Wood
AGENT

March 29, 1960 W. E. TRIEST 2,931,022
SPOT SEQUENTIAL CHARACTER GENERATOR
Filed June 16, 1954 13 Sheets-Sheet 12

INVENTOR.
WILLIAM E. TRIEST
BY
Theodore C. Wood
AGENT

March 29, 1960

W. E. TRIEST 2,931,022

SPOT SEQUENTIAL CHARACTER GENERATOR

Filed June 16, 1954

INVENTOR.
WILLIAM E TRIEST

BY

Theodore C. Wood
AGENT

United States Patent Office 2,931,022
Patented Mar. 29, 1960

2,931,022

SPOT SEQUENTIAL CHARACTER GENERATOR

William E. Triest, Hyde Park, N.Y., assignor to International Business Machines Corporation, New York, N.Y., a corporation of New York Application June 16, 1954, Serial No. 437,154

21 Claims. (Cl. 340—324)

The present invention relates to an improved apparatus and system for character synthesis and more particularly to an improved high speed electronic apparatus and system for character synthesis of the cathode ray type.

While the development of high speed electronic computers has resulted in steady advances in operating speed and storage capacity to a relatively high degree of refinement, one of the factors limiting the overall speed of operation of computers is the output printer or display system where the results of a calculation may be recorded or displayed.

Much ingenuity and considerable research have resulted in the development of mechanical and electromechanical printing devices of the prior art to a relatively high degree of refinement with respect to printing speed, efficiency and reliability. The operating speed of these devices, however, is always limited by the inherent mechanical inertia of the component moving parts and by available power. The highest speeds for mechanical and electromechanical printers have been achieved by parallel operation, i.e., in such manner that an entire line of characters is printed simultaneously. Such operation, however, always entails storage of the entire line of information to be printed, resulting in additional equipment and increased complexity being introduced into the system. Serial operation, while not requiring such storage and not subject to the resultant limitations imposed thereby, dictates a far lower maximum printing speed. Thus the need for a printing means capable of greater speed than the fastest mechanical system, but with serial operation, is manifest. Such a device may be employed, for example, not only for recording output data from an electronic computer, but also for accepting and recording information from a magnetic tape or drum or other type storage medium.

Electronic methods of character synthesis are practically free of inertia and therefore inherently capable of serial type operation at very high speed. The present invention is therefore directed toward an improved apparatus and method whereby character synthesis may be accomplished in a serial type operation by means of a cathode ray tube (CRT) and associated circuitry.

Accordingly, one of the objects of the present invention is to provide an improved apparatus for character synthesis wherein the character is generated for display as a succession of spots on the screen of a cathode ray tube at a high rate of speed.

Still another object of the present invention is to provide an improved apparatus for character synthesis which converts a succession of coded binary input signals to a succession of pairs of CRT deflection voltages in predetermined time-sequence, each of the pairs of deflection voltages being a function of the address which defines the coordinates of one of the spots comprising the selected character.

A further object of the present invention is to provide an improved apparatus which generates a character directly from a binary coded input signal.

Still another object of the present invention is to provide an improved apparatus for character synthesis wherein the number, type, or size of the symbols to be displayed may be varied with only relatively minor circuit modifications.

Another and still further object of the present invention is to provide an improved method of character synthesis comprising the steps of decoding a command signal to select a character to be synthesized, generating a succession of coded signals representing the selected character, decoding the signals to a deflection signal varying as a function of a coded address and controlling the deflection of a CRT by said decoded potentials, as a succession of spots.

Still another object of the present invention is to provide an improved method for generating a plurality of characters on the screen of a cathode ray tube comprising the steps of successively decoding, encoding and decoding to obtain a first and second series of deflection potentials varying as a pair of coded addresses and controlling the beam deflecting means of a cathode ray tube by said deflection potentials to thereby synthesize a character as a succession of spots.

A further object of the present invention is to provide an improved apparatus for character synthesis wherein a coding network having a plurality of stages together with means to actuate the successive stages of the network is provided to successively produce signals which when decoded and applied to the deflection plates of a cathode ray tube cause the beam of the cathode ray tube to be successively deflected from spot to spot in synchronism with the decoded signals to thereby synthesize a character.

Another object of the present invention is to provide an improved apparatus for character synthesis, wherein a coding network having a plurality of independent coding circuits, each representing an associated character, together with means to selectively actuate a series of coding circuits representing the selected characters is provided to cause each of the coding circuits to successively produce a series of signals which when decoded and applied to the deflection plates cause the beam of a cathode ray tube to be successively deflected from spot to spot in synchronism with the decoded signals for each character to thereby synthesize a plurality of characters in a predetermined sequence.

A further object of the present invention is to provide an improved apparatus for character synthesis wherein the character positioning potentials generated by the apparatus control both the position of the characters on the screen of a cathode ray tube and the sequence at which the characters are generated.

Other objects of the invention will be pointed out in the following description and claims and illustrated in the accompanying drawings, which disclose, by way of example, the principles of the invention and the best mode which has been contemplated of applying that principle.

Character generation may be accomplished by various systems which include cathode ray tubes, for example:

(1) Scanned character system.
(2) Line character system.
(3) A system of the type shown in U.S. Patents 2,275,017 and 2,283,383, issued to McNaney.

An example of the first system, referred to as the scanned character system, is the "two-scope" system illustrated in copending application No. 263,122, filed December 24, 1951, now U.S. Patent 2,754,360. In this method the intensity pulse coder consists of a cathode ray tube and a photocell; the cathode ray tube scans a raster behind a mask in which the characters have been cut out. As the beam passes a cut-out portion of the mask, light passes through to the phototube. Another cathode ray tube, the print tube, is swept in synchronism with the first cathode ray tube, and its grid is controlled by the pulses from the phototube so that it displays spots to form a character-shaped pattern. A variation of the scanned character system is disclosed in "High Speed Number Generator Uses Magnetic Memory Matrices," Electronics, vol. 26, No. 5, May 1953, pages 200–204. In this system, a television type raster is generated by the sweep circuits, using either sawtooth or staircase voltage sweep signals. The CRT beam is unblanked at appropriate times to generate a pattern of spots which defines the character.

In the second system, referred to as the line character system, horizontal and vertical sweep signals and intensity gate signals are generated so that the beam is deflected to trace out the character in a manner similar to the generation of familiar Lissajous patterns. The number of traces required to generate a character varies with the complexity of the character. Some of the characters can be formed by a single trace, while others require two or more traces to complete. The beam is unblanked during the time the beam is tracing a part of the character. An example of this type of system is disclosed in "Numeroscope for Cathode Ray Printing," Electronics, vol 21, No. 6, February 1948, pages 98–102.

The third system as shown in U.S. Patent 2,275,017 issued to McNaney, provides for all points of the character to be formed simultaneously. A special cathode ray tube of the type shown in Patent 2,283,383 also issued to McNaney, is employed. The cathode ray tube contains a matrix or mask having characters perforated therein interposed between the beam emitting system and a fluorescent screen. The CRT beam is deflected by X and Y deflection voltage to a particular portion of the matrix containing perforations in the form of the desired character, so that the beam emerging from the matrix to energize the fluorescent screen is in the shape of the selected character. The tube employed is specifically designed for a particular number, type and style of character.

While the above systems whereby character synthesis may be accomplished by means of cathode ray tubes are well-known in the prior art, in accordance with the principles of the present invention, there is disclosed an improved apparatus and method for synthesizing a character as a succession of spots on the screen of a cathode ray tube. The apparatus includes a plurality of coding circuits, each circuit representing an associated character, together with means to selectively actuate a single circuit or group of circuits to successively produce a series of coded signals for each selected character. These signals, when decoded and applied to the deflection plates of a CRT, cause the beam of the CRT to be successively deflected from spot-to-spot in a predetermined sequence to thereby synthesize a character or group of characters for display on the screen of the cathode ray tube at a high rate of speed. With respect to the ensuing description, the terms synthesize and generate, are used interchangeably with respect to the apparatus herein described.

In the drawings:

Figs. 1a and 1b are an overall block schematic diagram of a spot sequential character generator constructed in accordance with the principles of this invention.

Fig. 5b is a curve illustrating a preferred hysteresis characteristic for the material of the core shown in Fig. 5a.

Fig. 6b is a curve illustrating a preferred hysteresis characteristic for the material of the magnetic cores shown in Fig. 6a.

Fig. 7 illustrates in block schematic form a further embodiment of the coding network which may be used in the character generator of Fig. 1.

Fig. 8 illustrates in block schematic form the ring control and synchronizing circuit identified as block 57 in Fig. 1.

Fig. 9 illustrates in simplified schematic form the character generator control circuit, identified as block 66 in Fig. 1.

Figure 2:
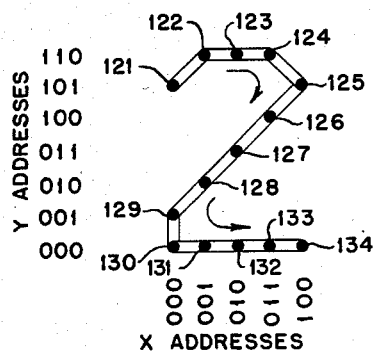
Fig. 2 illustrates a synthesized character of selected spots on a 7 x 5 matrix as it appears on the screen of a CRT, and further serves to illustrate the relationship between the X and Y addresses and the matrix positions which they define.

Referring to the drawings and more particularly to Fig. 1 thereof, a plurality of registers 1—8 are provided for intermediate storage of binary coded character selection signals. Registers 1—8 are connected through their associated gate circuits, shown as logical AND circuits 9 through 16 respectively, to OR circuit 17, and thence to buffer register 18. The output from buffer register 18 is applied to character selection network 19 through conductors 20 through 27. The character selection network 19 operates to select one of output conductors 28 through 43, these output conductors representing 16 characters available for synthesis. Sequence switch 45 operates to sample the contents of registers 1 through 8 by means of gate circuits 9 through 16 and associated conductors 46 through 53 respectively, to thereby control read in to character selection network 19 of four binary stages at a time, the output signals of each four stage register representing a single character. The sampling proceeds successively, so that the character selection signals stored in registers 1—8 are read into character selection network 19 in sequence, thereby resulting in the successive energization of conductors 28—43 in the order determined by the contents of the registers 1 through 8.

Output conductors 28—43 are connected to coding network 55. Coding network 55, together with a ring circuit 56, operates to provide a series of sequentially related binary signals to the three X and Y signal lines, shown as $X_0$, $X_1$, $X_2$, $Y_0$, $Y_1$ and $Y_2$, respectively, these signals varying in accordance with a predetermined code, the rate of sequence being determined by the rate of operation of the ring circuit. An end of character signal, described hereinafter, is also supplied by the above combination.

Referring now to Fig. 2, it will be noted that a character, such as the character 2, can be represented by a succession of spots, each spot being defined by an X address and a Y address. With a maximum of 5 X addresses and 7 Y addresses, 35 possible addressable spots are available in the 7 x 5 matrix.

Returning now to Fig. 1, the number of stages in ring circuit 56 is determined by the size of the matrix required to define the selected character in accordance with the binary coded X and Y address. The size of the matrix is generally determined by visual factors such as the size and sharpness of definition of the characters to be displayed. In the apparatus herein described, a 7 x 5 matrix is utilized since it has been found to give satisfactory definition of characters on the screen of a cathode ray tube. The X and Y addresses each consist of 3 bit binary signals, a succession of such 3 bit signals defining the X and Y coordinates of the spots comprising the selected character.

Assuming a 7 x 5 matrix, a maximum of 20 spots is sufficient to define any character. Each spot of the selected character is defined by the intersection of an X and Y coordinate, each of these coordinates in turn being defined by an associated 3 bit coded address signal. To provide the necessary signals under the above conditions, a 20 stage ring is employed throughout the ensuing discussion for illustrating an apparatus employing the principles of this invention. However, it is obvious that the amount of associated equipment will vary, though not directly, as the size of the matrix selected to define a character. In general, the number of stages in the ring and the number of elements in the coding network will vary directly as the maximum number of spots required to define a character.

Figure 13:
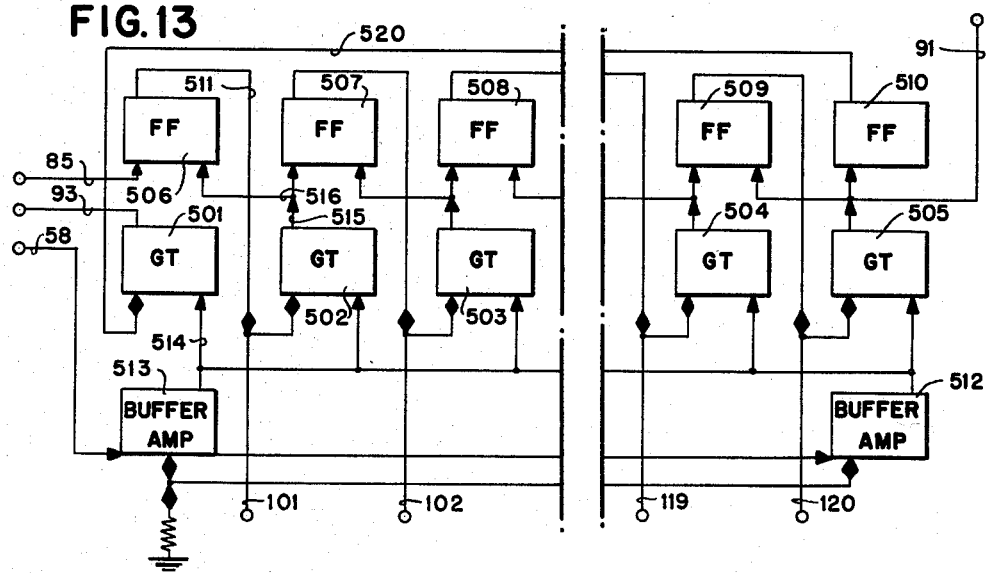
Fig. 13 illustrates in block form the ring circuit, identified as block 56 in Fig. 1.

The 20 stage ring circuit described herein is illustrated in Fig. 13 to be described in greater detail hereinafter. The ring circuit basically includes a plurality of gate tubes, each gate tube controlling an associated flip-flop, the combination of a single gate tube and its associated flip-flop comprising each stage of the ring circuit. The pulse used to drive the ring circuit is provided by ring control and synchronizing circuit 57, shown interconnected to ring circuit 56 through conductor 58.

As the description advances, it will be shown that the interconnected gate tubes and flip-flops comprising ring circuit 20 are coupled sequentially to form a closed ring wherein the flip-flops are rendered On successively, i.e., for each voltage pulse applied to the ring on conductor 58, a flip-flop is rendered On as its preceding flip-flop is rendered Off. Only one flip-flop is On at any one time, and the On condition propagates through the successive stages of the ring, the rate of propagation being determined by the rate of the pulses applied on conductor 58. When in the On condition, the output from the flip-flop is a positive D.C. level, while in the Off condition, the output from the flip-flop is a negative D.C. level. Twenty pulses are required to advance the ring around once.

Coding network 55, operating with ring circuit 56 in a manner to be described in greater detail hereinafter, provides a series of sequentially related output signals in the form of positive pulses for the particular character selected, the signals varying in amplitude according to a predetermined code. A 3 bit X and a 3 bit Y binary coded address is employed to define each spot of the selected character on a 7 x 5 matrix.

The coded X address signal output lines $X_0$, $X_1$ and $X_2$ and the coded address signal Y output lines $Y_0$, $Y_1$ and $Y_2$ are connected to X and Y decoders 60 and 61 respectively. Decoders 60 and 61 operate to convert the X and Y input signals into X and Y potentials varying in amplitude as a function of the X and Y coded addresses which define the spots comprising the selected character. Output potentials from X and Y decoders 60 and 61 are connected to mixer circuits 62 and 63 through conductors 64 and 65 respectively, where they are mixed with the character positioning potentials supplied by the character generator control circuit 66 through conductors labeled $X_b$, $X_c$, $X_d$ and $Y_b$. The resultant output potentials from the mixer circuits 62 and 63 are applied to horizontal and vertical deflection plates 67 and 68 of CRT 69 through conductors 70 and 71 and deflection amplifiers 72 and 73 respectively.

Control grid 74 of CRT 69 has an unblanking potential applied thereto when flip-flop 75 is in the On condition. The output of flip-flop 75 is applied to control grid 74 of cathode ray tube 69 through conductor 76, intensity amplifier 77 and conductor 78. Flip-flop 75 is set in the On state by the pulse output from gate circuit 80. Gate circuit 80 is conditioned by the D.C. level output from flip-flop 81 when that flip-flop is in the On condition, and receives a pulse input from ring control and synchronizing circuit 57 through conductor 82 and delay circuit 83. Flip-flop 75 is set in the Off condition by pulses from ring control and synchronizing circuit 57 on conductor 82, which in turn is connected to conductor 58, to thereby blank the beam of cathode ray tube 69. Flip-flop 81 is set in the On condition by a pulse output from ring control and synchronizing unit 57 on conductor 84, which is in turn connected to conductor 85. The pulse on conductor 85 also initiates operation of the ring circuit 56. Flip-flop 81 is set in the Off condition upon completion of the synthesis of each character by a pulse supplied by the coding network 55 through conductor 86.

As already noted, sequence switch 45 operates to sample the contents of registers 1 through 8 by means of gate circuits 9 through 16, and this sampling proceeds successively. It is to be further noted that sequence switch 45 is controlled by voltages on conductors $X_a$, $X_b$, $X_c$, $X_d$, $Y_a$ and $Y_b$, these voltages being produced by character generator control circuit 66.

*Operation in generating a single character*

Pulse generator 88 supplies pulses to character generator control circuit 66 when switch 89 is in the closed position. The character generator control circuit then operates to produce a start pulse on line 90, which initiates operation of the ring control and synchronizing circuit 57. Operation of the ring circuit 56 is initiated by a pulse applied by ring control and synchronizing circuit 57 to the first stage of the ring circuit 56 through conductor 85. Upon receipt of the start pulse, ring control and synchronizing circuit 57 also generates a series of .1 microsecond pulses, at a rate of 500 kc., which are applied through conductor 58 to drive ring circuit 56 once operation is initiated. As pulses from conductor 58 are applied to ring circuit 56, the successive stages of the ring are set in the On condition, thereby successively energizing ring output conductors 101-120 inclusive. When the last stage of the ring circuit is set in the On condition, a pulse is applied to character generator control circuit 66 from conductor 91 for controlling the synthesis of a plurality of characters to be described hereinafter. After the ring circuit has advanced through a complete cycle, the output from the 20th stage of the ring conditions the first stage, so that the next succeeding pulse on conductor 58 is returned by way of conductor 93 to ring control and synchronizing circuit 57. This returned pulse will initiate another cycle of the ring circuit 56 provided a stop pulse is not received from character generator control circuit 66. If a stop pulse is applied to ring control and synchronizing circuit 57 by character generator control circuit 66, the ring cannot be recycled as will be shown hereinafter.

For purposes of the ensuing description, it is assumed that one conductor from character selection network 19, for example, conductor 28, has been selected, thereby resulting in one coding circuit in coding network 55 being energized. As ring circuit 56 operates to apply a pulse to output conductors 101—120 successively, each pulse will cause coding network 55 to produce a set of coded output signals on conductors $X_0$, $X_1$, $X_2$ and $Y_0$, $Y_1$ and $Y_2$. These coded output signals are decoded by X and Y decoders 60 and 61 respectively to produce potentials varying as the addresses which define the coordinates of the spots comprising the selected character. The output signals from the X and Y decoders are then applied to mixing circuits 62 and 63 respectively, where they are mixed with suitable positioning voltages, to be described in greater detail hereinafter, to thereby produce X and Y deflection potentials which are applied to the horizontal and vertical deflection plates 67 and 68 of cathode ray tube 69 through associated deflection amplifiers 72 and 73 respectively.

It is well-known in the electrical art that the intensity of the electron beam within a cathode ray tube may be controlled by varying the bias voltage applied to its control grid. For the purpose of this description, the electron beam is referred to as being blanked or unblanked. When the electron beam strikes its fluorescent screen so that visible light rays are emitted therefrom, the electron beam is arbitrarily referred to as being unblanked. When the electron beam fails to cause visible light rays to be emitted from its fluorescent screen, the electron beam is described as being blanked. The intensification circuit operates to blank and unblank the beam in synchronism with the X and Y coded address signals to thereby define a character as a succession of spots in a manner to be described below.

The intensification control circuit of the present apparatus includes flip-flop 75, intensity amplifier 77, gate circuit 80, flip-flop 81 and delay circuit 83, and operates in the following manner. The ring starting pulse, generated by the ring control and synchronizing circuit and applied on conductor 85, is also applied to conductor 84 to thereby turn flip-flop 81 to the On condition. Flip-flop 81 remains in the On condition during the synthesis of a complete character, and is turned Off by a pulse supplied by coding network 55 on conductor 86. Flip-flop 81 supplies a D.C. level to condition gate circuit 80. The ring driving pulses applied by ring control and synchronizing circuit 57 to conductor 58 are also applied through conductor 82 to delay circuit 83, where they are delayed 1.3 micro-seconds before being applied to gate circuit 80. The pulse on conductor 82 also turns flip-flop 75 Off. When the delayed pulse is applied to gate circuit 80, the gate circuit fires and emits a pulse to turn flip-flop 75 On. The pulse output from flip-flop 75 is applied to intensity amplifier 77 via conductor 76, which raises the amplitude of the signal applied to control grid 74 of cathode ray tube 69 to the desired level for proper intensity. Since the pulses to the ring and intensification circuits are applied at two microsecond intervals, the duration of the intensity signal is only .7 microseconds on each spot before flip-flop 75 is turned Off by the next ring driving pulse on conductor 82 to thereby blank the CRT beam. The above described operation is repeated for each spot of the selected character, so that upon completion of the ring cycle, the selected character is synthesized as a succession of spots.

The speed of character synthesis employing the apparatus illustrated in Fig. 1 is determined, for the most part, by the pulse rate of the ring driving source in the ring control and synchronizing circuit, which may be, for example, 500 kc. Under synchronous operation in the manner described, 40 microseconds is required for the generation of each character. However, by employing asynchronous operation in a manner to be described hereinafter with respect to the ring control and synchronizing circuit, illustrated in Fig. 9, the character generation speed could be reduced to an average speed of 28 microseconds per character with a ring circuit operation of 500 kc.

Referring now to Fig. 2, there is illustrated therein the character "2" as defined by a succession of spots on a 7 x 5 matrix, the spots, shown as 121—134, being generated in sequence in accordance with a predetermined code. The spots are provided by the CRT beam at each intersection of a pair of X and Y addresses, and are generated in sequential fashion in the direction indicated by the arrows. The character 2 has been selected as illustrative of a typical character, in that it is defined by 14 spots, the average number required to define a character on a 7 x 5 matrix.

As shown, the matrix is composed of five X addresses, each of the addresses specifying a horizontal level, and seven Y addresses, each of the addresses specifying a vertical level, the lines represented by the X and Y addresses together making up a 7 x 5 matrix. A maximum of 35 possible intersections are available to define a character on a 7 x 5 matrix.

Table 1, shown below, lists in binary code the signals to the X and Y decoder and the corresponding X and Y addresses for the character 2, for each stage of the ring circuit.

| Ring Circuit Stage | X Address | Signal to X Decoder $X_0X_1X_2$ | Y Address | Signal to Y Decoder $Y_0Y_1Y_2$ |
|---|---|---|---|---|
| 1 | 000 | 000 | 101 | 101 |
| 2 | 001 | 001 | 110 | 011 |
| 3 | 010 | 011 | 110 | 000 |
| 4 | 011 | 001 | 110 | 000 |
| 5 | 100 | 111 | 101 | 011 |
| 6 | 011 | 111 | 100 | 001 |
| 7 | 010 | 001 | 011 | 111 |
| 8 | 001 | 011 | 010 | 001 |
| 9 | 000 | 001 | 001 | 011 |
| 10 | 000 | 000 | 000 | 001 |
| 11 | 001 | 001 | 000 | 000 |
| 12 | 010 | 011 | 000 | 000 |
| 13 | 011 | 001 | 000 | 000 |
| 14 | 100 | 111 | 000 | 000 |
| 15 | 000 | 000 | 000 | 000 |
| 16 | 000 | 000 | 000 | 000 |
| 17 | 000 | 000 | 000 | 000 |
| 18 | 000 | 000 | 000 | 000 |
| 19 | 000 | 000 | 000 | 000 |
| 20 | 000 | 000 | 000 | 000 |

A pair of X and Y addresses denotes a coordinate intersection which appears as a spot on the 7 x 5 matrix. A set of X and Y coordinates in proper time sequence defines a character. As shown in Table 1, the X and Y addresses necessary to define a character are predetermined, so that upon selection of a character and initiation of the ring circuit operation, the character is generated as a succession of spots without external control. Coding network 55, together with ring circuit 56, operates to produce a series of three bit X, three bit Y and one bit character termination signals, the former two of which constitute the inputs of the associated X and Y decoders listed in Table 1.

Referring now to Table 1, it is seen that the signals to the X and Y decoders differ from the corresponding X and Y coded address signals. These two sets of signals are required due to the spot sequential technique employed by the present apparatus, wherein the beam of the CRT is caused to move successively from spot to spot rather than return to the zero position between spots. The digital-to-analog converters, illustrated in and more fully described hereinafter with respect to Fig. 16, effectively operate as three stage flip-flop registers. The flip-flops used in the decoders 60 and 61 may be of the type illustrated in Fig. 14 to be more fully described hereinafter. If the signal applied to the complement input of a register stage is representative of a binary "1," the state of the flip-flop is reversed; if the input to the same register stage is representative of a binary "0," the associated flip-flop remains in its existing state. The output of each flip-flop is one of two possible states; if the flip-flop is in the "1" condition, a positive D.C. output level is obtained, if the flip-flop is in the "0" condition, no output is obtained. The output of each stage of the decoder is weighted in a binary fashion as disclosed hereinafter with respect to Fig. 3. Thus the resultant decoder output for each stage of the ring circuit is a D.C. potential equal to the sum of the individual weighted outputs from each flip-flop in the decoder, this potential varying in amplitude as a function of the associated coded address. The input signals to the decoders, shown in Table 1 as signals to the X and Y decoders respectively, are the signals required to modify the existing X and Y addresses produced at the output of the digital-to-analog decoders for any stage of the ring circuit to a new output varying as the X and Y addresses for the following stage of the ring circuit. Thus, whenever any bit of the three bit X or Y address signals differs from the corresponding bit in the preceding address, i.e., whenever a "0" is changed to "1" or a "1" to "0", a positive signal representative of a binary "1" is applied to the complement input of the associated flip-flop, thereby reversing the state of the flip-flop. In this manner, each X and Y address signal for a particular ring stage is modified within the decoder network by the signal to the X or Y decoder for the succeeding ring stage to produce an output signal varying as a function of the succeeding address. The process is repeated until all the X and Y address signals have been produced.

The signals to the X and Y decoders are the output signals produced by the coding network. By applying the potential output of the decoders through mixing networks to the beam deflection plates of a CRT, the beam of the CRT is enabled to move directly from spot to spot to thereby synthesize the selected character. In this manner, a character is synthesized in accordance with a predetermined code.

While the 5 X addresses and 7 Y addresses of the coordinates shown in Fig. 2 are common to all characters which may be generated on the 7 x 5 matrix, the thirty-five available intersections of said X and Y addresses on the matrix and the sequence at which the selected spots may be generated provide the variation necessary to generate different characters. A separate coding network will be necessary for each particular character using the above common X and Y addresses, since each character differs from other characters both in the spots required to define such character and in the particular sequence at which the selected spots are generated. While a single character shown in Fig. 2 has been described as illustrative of the spot sequential method of character generation, the technique employed to generate any character on such a matrix is identical.

*Operation in generating a plurality of characters*

While the synthesis of a single character has been described in detail with reference to Fig. 1, the apparatus illustrated therein is capable of selectively synthesizing a plurality of characters in a predetermined sequence.

Referring again to Fig. 1, a plurality of four bit binary registers 1—8 are employed to provide storage for the four bit character selection signals representing the character to be synthesized. The apparatus described herein is specifically designed to synthesize eight characters, two lines of four characters per line, but the capacity of the apparatus may obviously be modified in a manner hereinafter described to fit a particular application. Registers 1—8 may serve as buffer registers wherein the data may be supplied to the registers at a slow rate of speed as compared to the high speed at which the data may be utilized by the character generator herein described. Examples of input devices for supplying data to character selection signal registers 1—8 are punched cards, magnetic tape, magnetic drum, computers and manually operated switches.

With respect to the code employed in the apparatus herein described, it is assumed that the information to specify characters is in binary form, though it would be obvious to one skilled in the art that a number system based on any other radix might be employed.

Character selection signal registers 1—8 have a parallel readout which reads into buffer register 18 under the control of the associated gate circuits 9—16. Gate circuits 9—16 are logical AND circuits which are conditioned by the D.C. level inputs from the associated registers 1—8 and energized by the D.C. level applied by sequence switch 45 through conductors 46-53 inclusive. An example of a logical AND circuit which may be employed is described in copending application, Serial Number 414,459, filed on March 5, 1954, by Bernard L. Sarahan et al.

OR circuit 17 is connected between the character selection signal registers 1—8 and buffer register 18 and serves to isolate the individual registers from a common load. In the apparatus illustrated herein, eight "8" input "OR" circuits are employed. The number of "OR" circuits will vary as the number of registers, while the number of inputs to each OR circuit will vary as the number of binary stages in each storage register. Examples of logical OR circuits and registers which may be employed are described in the aforementioned Sarahan et al. application.

Buffer register 18 receives input data from registers 1—8 in the manner described above, this data representing in binary coded form the characters to be synthesized. The number of stages in buffer register 18 is directly related to the character capacity of the apparatus herein described. For $2^n$ characters available for synthesis, $n$ bi-stable stages are required. For 16 character capacity, four bi-stable stages are required in the register. Any type register having two stable states for each stage may be employed. For purposes of the ensuing description, buffer register 18 will be assumed to be a flip-flop register having positive and negative D.C. level outputs on each stage.

Figure 3:
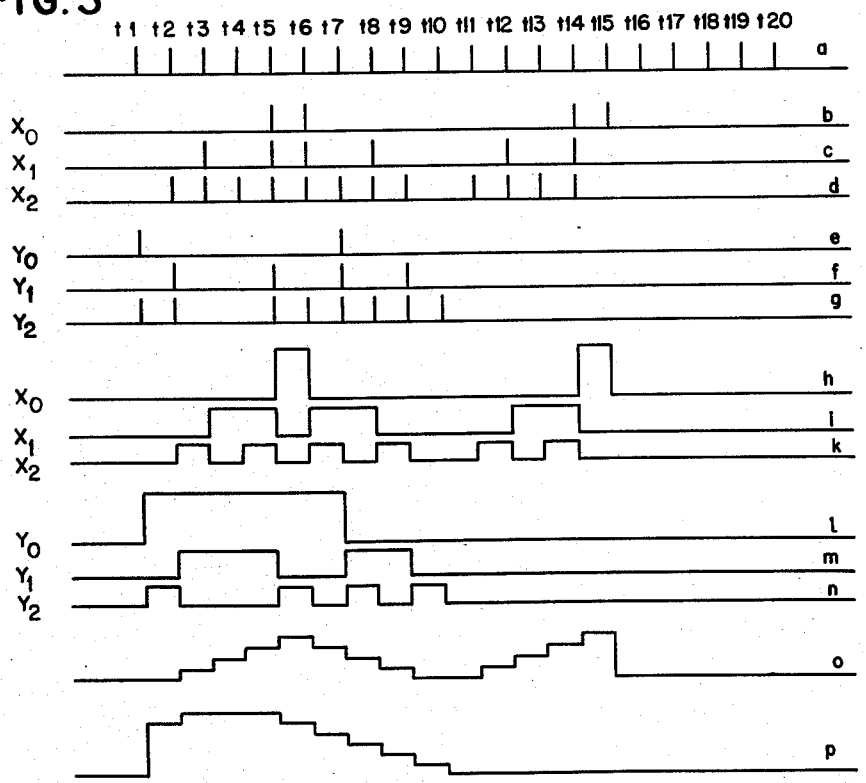
Fig. 3 shows a family of curves, illustrating the potential waveforms necessary to generate the character "2," the potentials originating at the ring driving circuit and proceeding in time sequence through the coding and decoding networks to thereby generate the X and Y deflection potentials proportional to the coded addresses which define the character.

Buffer register 18 has a parallel read out which reads into the character selection network 19 through 4 pairs of conductors 20 through 27. Character selection network 19 is a switching array having 4 pairs of input conductors and 16 output conductors, this network operating to select a particular output conductor representing the character to be synthesized in response to a specific combination of binary coded input signals supplied by buffer register 18. Such a switching device is well-known in the art as a matrix switch decoder, a widely employed type of which uses crystal rectifier networks. Such a device is disclosed, for example, in "Rectifier Networks for Multiposition Switching," by Brown and Rochester, Proceedings of the I.R.E., February 1949, pages 139–147, wherein Fig. 2 illustrates a 16 position switch having 16 outputs and 4 pairs of inputs. A rectangular matrix network such as shown in Fig. 3 of the above noted Brown and Rochester treatise, having 16 output conductors and 4 pairs of input conductors includes 16 4-way logical AND circuits or a total of 64 diodes, so arranged that only one output conductor representing the selected character is selected in response to a coded input signal. However, other types of networks involving a more economical arrangement of diodes, tubes and space, are also disclosed in the above noted Brown and Rochester treatise. Such a matrix decoder may be designed for either positive or negative input signals by employing positive or negative logical AND circuits respectively. By the convention herein employed, inputs to the character selection network will be positive and negative D.C. levels, while the output conductor representing the selected character will be positive and the remaining conductors negative except where noted. On the other hand, either conductor of each stage from buffer register 18 may apply positive or negative D.C. level inputs to the character selection network according to the code for the character being synthesized.

Character selection network output conductors 28–43 represent 16 characters available for synthesis. Each of the conductors is connected to an associated coding circuit within coding network 55.

Sequence switch 45 controls gate circuits 9—16 through conductors 46—53 respectively, to thereby prevent read in to buffer register 17 when a character is being synthesized. Sequence switch 45 operates in a manner hereinafter described to apply a positive potential to one of the gate circuits in response to the positioning voltages labeled $X_a$, $X_b$, $X_c$, $X_d$, and $Y_a$ and $Y_b$.

Coding network 55, composed of a plurality of coding circuits for each character available for synthesis, operates with ring circuit 56 to produce a first and second series of control pulses, heretofore referred to as signals to the X and Y decoder respectively.

It will be assumed in the ensuing description that it is desired to synthesize two rows of four characters each. When switch 89 is closed, a start pulse is applied from pulse generator 88 to character generator control circuit 66 through conductor 94. Control circuit 66, in addition to applying a start pulse to ring control and synchronizing circuit 59 on conductor 90 to start the character generator, applies potentials to conductors $X_a$ and $Y_a$. These potentials are applied to sequence switch 45, resulting in a positive control potential being applied to AND circuit 9 through conductor 46 to thereby cause read in of the data in register 1 to buffer register 18. The character generator thereupon synthesizes the character in the manner described with respect to the synthesis of a single character.

The $Y_a$ potential is also applied to mixing circuit 63 to thereby control the vertical positioning of the character on the screen of a CRT. It is to be noted that conductors $X_a$ and $Y_b$ are not connected to mixing circuits, for reasons which will be described in greater detail hereinafter. $X_a$ serves as the reference level for the potentials $X_b$, $X_c$ and $X_d$, while the two output levels of conductor $Y_a$ provide the vertical positioning potentials $Y_a$ and $Y_b$. Characters to be displayed as the first line on the CRT are positioned by potential level on pairs of conductors $X_a$—$Y_a$, $X_b$—$Y_a$, $X_c$—$Y_a$ and $X_d$—$Y_a$, while positioning of the second line of characters will be controlled by potentials on conductors $X_a$—$Y_b$, $X_b$—$Y_b$, $X_c$—$Y_b$ and $X_d$—$Y_b$. The positioning of each character, therefore, is determined by a pair of potentials under control of character generator control circuit 66. Upon completion of the synthesis of the first character, a control signal is applied from the 20th stage of the ring through conductor 90 to character generator control circuit 66. This control signal causes positioning potentials to be applied by character generator control circuit 66 to conductor $X_b$ and $Y_a$ in a manner hereinafter described. These signals cause sequence switch 45 to emit a switching level signal on conductor 47 to thereby cause the data stored in register 2 to be read into buffer register 18 in a manner described heretofore.

Conductor 93, connected between ring circuit 56 and ring control and synchronizing circuit 57, causes the ring to be recycled to thereby synthesize the succeeding character. Upon completion of each character, another combination of conductors is selected by character generator control circuit 66, and the positive potentials applied thereto result in the coded data representing the succeeding character being entered into buffer register 18. Upon completion of the fourth character on line 1, the output signal level $Y_a$ is modified to provide vertical positioning for the second line of characters, and the ring is again recycled four times to produce the second line of four characters in the manner described above. Upon synthesis of the last character, the control pulse from the 20th stage of the ring causes the character generator control circuit to emit a stop character generator pulse on conductor 92. This stops the process of character synthesis until the process is again initiated by a start pulse applied by character generator control circuit 66.

The coding network shown as block 55 in Fig. 1 may take many forms, examples of which are shown in Figs. 4 through 7.

Figure 4:
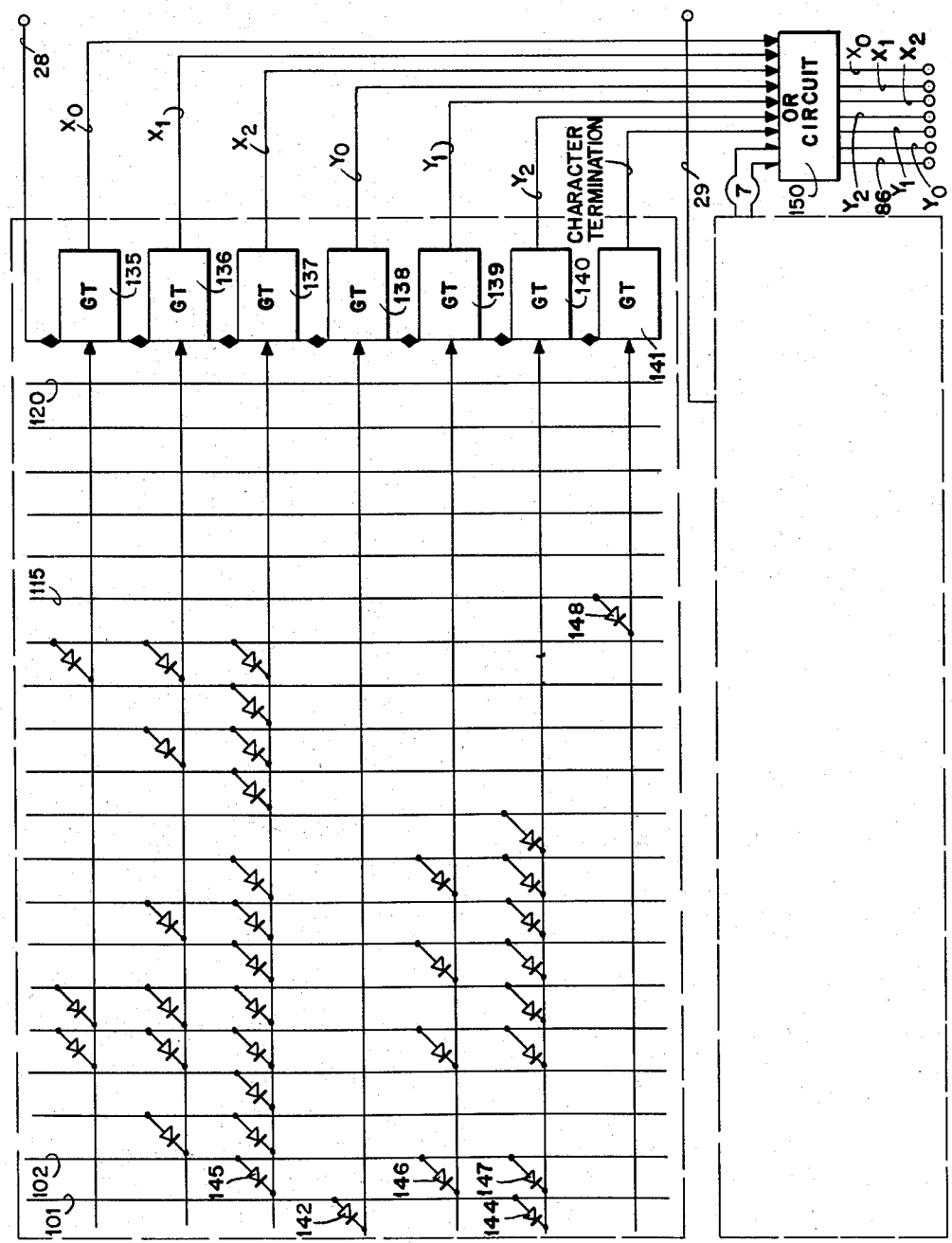
Fig. 4 illustrates in block schematic form one embodiment of the coding network which may be used in the character generator of Fig. 1.

Fig. 4, for ease of illustration, shows only two of the 16 coding circuits within the coding network 55 and further shows one of those coding circuits in detail. The coding circuit of Fig. 4 may be termed a diode coding circuit, that is, diodes are connected between the ring output conductors and the coding network output conductors in accordance with a predetermined code for the particular character represented by the coding circuit. The coding circuit shown in detail in Fig. 4 shows the diode connections used to generate the coded signals for the character "2."

The apparatus illustrated in Fig. 4 operates in the following manner to produce these coded signals to the X and Y decoder. Output line 28 representing the character "2" is selected by character selection network 19 in a manner described with reference to Fig. 1, and a positive D.C. potential is applied thereto. This D.C. potential operates to condition gate circuits 135 through 141. The gate circuits used throughout the apparatus herein described are of the type conditioned by a D.C. signal and made conducting upon receipt of a short duration pulse. As the ring circuit 56 of Fig. 1 steps along, a positive signal is emitted on ring output lines 101—120 successively. As the signal is applied to each ring output conductor, it appears on coding network output conductors if the ring output conductor is connected to the coding network output conductors through an associated diode. For example, the output pulse applied to ring output conductor 101 will produce a binary "1" at coding network output conductors $Y_0$ and $Y_2$, since conductor 101 is interconnected to conductors $Y_0$ and $Y_2$ through diodes 142 and 144 and gate circuits 138 and 140 respectively. The remaining conductors $X_0$, $X_1$, $X_2$, and $Y_1$ since they are not connected to ring output conductor 101 through a diode, will not receive an output signal. Thus the signals to the X and Y decoder for the first ring output line are 000 and 101 respectively, which correspond to the values listed for ring stage 1 in Table 1. Similarly, the signal emitted on ring output conductor 102 is applied to the $X_2$, $Y_1$ and $Y_2$ signal lines through diodes 145, 146 and 147, to produce output signals to the X and Y decoder of 001 and 011, respectively, which correspond to the signals to the X and Y decoder listed for ring stage 2 in Table 1. A signal on ring output conductor 115 which corresponds to ring stage 15 in Table 1, is applied to the end of character signal output conductor through diode 148, and gate circuit 141 to control the intensity of the CRT beam in the manner described heretofore.

While the coding circuit for a single character has been described in detail, a separate coding circuit is required for each different character to be generated. The coding circuits for the remaining characters would include 7 signal lines per character, each line having an associated gate circuit, together with an array of diodes wired according to the code for the particular character. Ring output lines 101–120 inclusive would be common for all circuits. Seven signal lines, each line having an associated gate circuit, are unique for each character coding circuit, but only the signals generated for the selected character appear at the input to the X and Y decoders, since only the gate circuits associated with the selected character will be conditioned in the manner pointed out above. Where a plurality of diode coding circuits are employed for separate characters, a logical "OR" circuit 150 is employed to combine the coding circuit outputs.

Figure 5A:
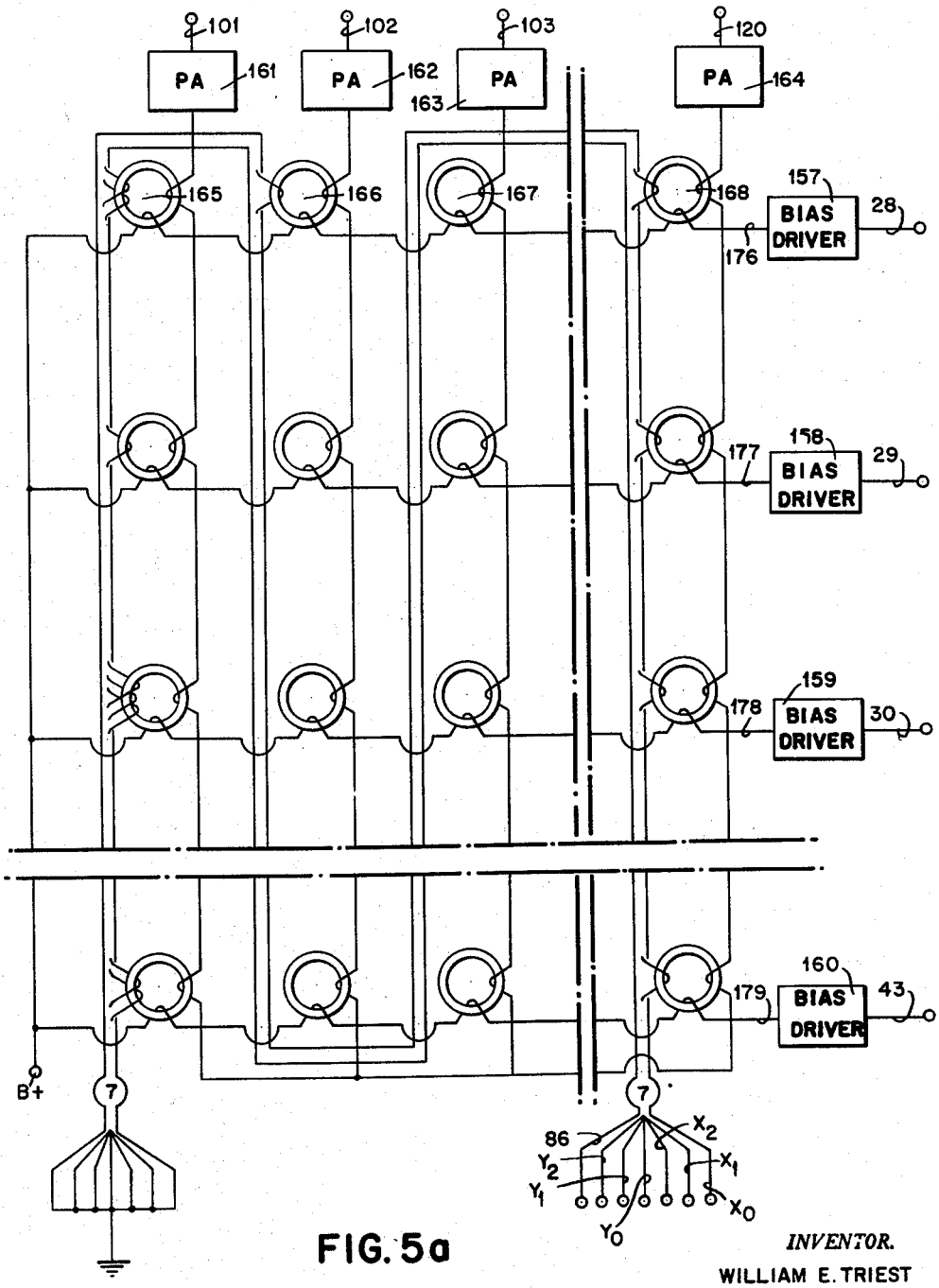
Fig. 5a illustrates in block schematic form another embodiment of the coding network which may be used in the character generator of Fig. 1.

Referring now to Fig. 5a, there is illustrated therein a spot-sequential character generator including a coding network of magnetic cores of the type having relatively low magnetic retentivity. The magnetic cores employed in the coding network are arrayed in horizontal rows and vertical columns, each character requiring a separate row of 20 cores. For $n$ characters, the network contains $n \times 20$ cores, and at any time $20(n-1)$ cores are biased into magnetic saturation. Each output conductor of the character selection network 19 of Fig. 1 is connected to an associated row of cores through bias drivers shown in block form as 157—160 and illustrated in schematic form in Fig. 5c. A negative potential is applied to all of the conductors 28–43 except the selected one, to which a positive potential is applied. The bias driver effectively operates as a switch. A negative input to an associated bias driver is inverted to produce a current output, while a positive input to the bias driver produces a zero output, the current or zero outputs being applied on conductors shown as 176—179. The operation of the bias driver is more fully described with reference to Fig. 5c. Each ring output conductor 101—120 has an associated pulse amplifier, illustrated as 161-164 inclusive, which is employed to raise the pulse amplitude to a predetermined level which will be more fully described hereinafter. The cores, as noted, are arranged in column form, each vertical column consisting of cores from the horizontal rows associated with each character coding circuit. Ring output lines 101—120 are, as shown, common to all cores in their associated column. Each row of cores in turn has seven associated signal conductors threaded through or around each core in the row in a manner hereinafter described, a conductor threaded through the core representing a binary "1," a conductor threaded around the core representing a binary "0." As the ring moves along in sequential fashion, a signal is emitted to each column from its associated ring output conductor and pulse amplifier. The cores are so wound that the driving current emitted from pulse amplifiers 161—164 produces mmf. of the same polarity as that produced by the bias drivers on the rows of non-selected cores, which merely drives the non-selected cores further into magnetic saturation. This produces relatively no change of flux, because the bias current applied is sufficient to cause these cores to be driven far into magnetic saturation.

However, with respect to the row of cores representing the selected character, no bias is exercised on the cores and mmf. supplied by current pulses from the pulse amplifiers 161—164 will produce a relatively large change of flux in the cores, the current emitted from pulse amplifiers 161—164 is such that magnetization of the core occurs within the hysteresis loop of the core material. For purposes of the ensuing discussion, the row of cores shown in Fig. 5a as 165—168 will be assumed to comprise the coding network for the character 2. One of two effects is produced with respect to the seven associated signal conductors. If the conductor is threaded through the core, the current pulse produces a change in flux which induces a potential in the conductor in the form of a voltage pulse representing a binary "1," if the conductor passes outside the core, no voltage is induced, representing a binary "0." The wiring pattern for the seven signal conductors associated with each character is such that the signals produced on the seven conductors linking the cores in the coding circuits are those signals previously referred to as signals to the X and Y decoders respectively, and character termination signals for controlling the intensity of the CRT beam.

It is to be noted in Fig. 5a that the seven output conductors of the coding network are shown as being threaded through certain cores of the various rows and columns, and around certain others of the cores. Fig. 5a is not intended to indicate the actual wiring of the output conductors but is merely intended to illustrate the general arrangement of those wires. It should be particularly noted in Fig. 5a that the same seven output conductors are threaded through or around all of the cores in the network.

Figure 5B:
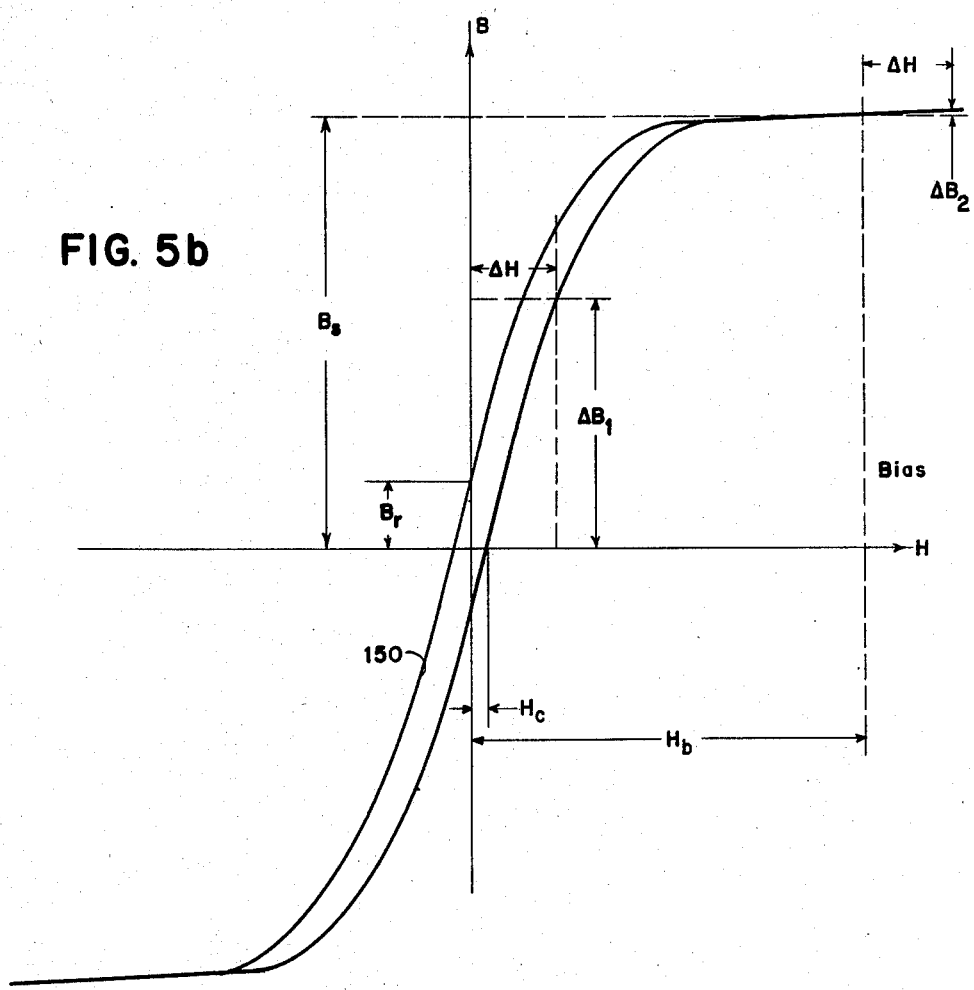

Referring now to Fig. 5b, there is shown a curve 150 illustrating a preferred hysteresis characteristic for the material of the magnetic core employed in the coding network of Fig. 5a. An example of such material is known in the art as Ferramic H. The coercive force, shown as $H_c$, should be as small as possible, while the remanence or retentivity $B_r$ or the material should be very low as compared to the saturation flux density $B_s$. It is desirable to have the transition from the unsaturated state to the saturated state of the core material occur as sharply as possible.

A magnetizing force, delta H, of short time-duration, applied to a core with the magnetization characteristic shown in Fig. 5b will produce a large change of flux, delta $B_1$, in the selected cores and a very small change of flux, delta $B_2$, in the non-selected cores due to the large bias magnetomotive force $H_B$ exerted on the non-selected cores. Since the voltage induced in the signal windings on such a core is proportional to the change of flux produced, significant output voltages are obtained only from the selected cores.

Figure 5C:
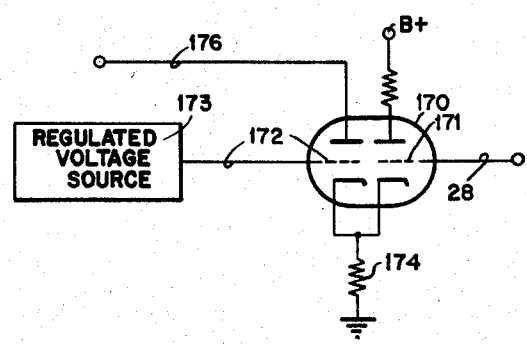
Fig. 5c is a wiring diagram of a bias driver employed in the magnetic core coding network shown in Fig. 5(a).

Referring now to Fig. 5c, there is illustrated in schematic form a bias driver of the type illustrated in block form as 157—160 in Fig. 5a. The circuit contains a dual-triode tube 170, which may be, for example, a vacuum tube type 5998. In order for this circuit to supply bias current, the negative output potential from the character selection network 19 of Fig. 1 is applied to the control grid 171 of the first section of the dual triode 170 through conductor 28. The negative potential is of sufficient amplitude to cause that section of the tube to cut off. The control grid 172 of the second section of the dual triode 170 is connected to a regulated voltage source 173 which causes the second section to conduct when the first section is non-conducting. When the second section of tube 170 conducts, the current on output conductor 176 is of sufficient amplitude to bias the cores, controlled by that bias driver, far into magnetic saturation. With respect to the output conductor of the character selection network 19 of Fig. 1 representing the selected character, the positive potential applied to control grid 171 of the first section of dual-triode 170 causes that section to conduct. When the first section is conducting, it draws sufficient current to develop a voltage across cathode resistor 174, thereby raising the cathode potential which effectively reduces the grid bias of the second section of dual triode 170 to such a level that it cuts off. Thus the row of cores associated with the selected character has zero bias, while the rows associated with non-selected characters have sufficient bias to cause them to be saturated.

Figure 6A:
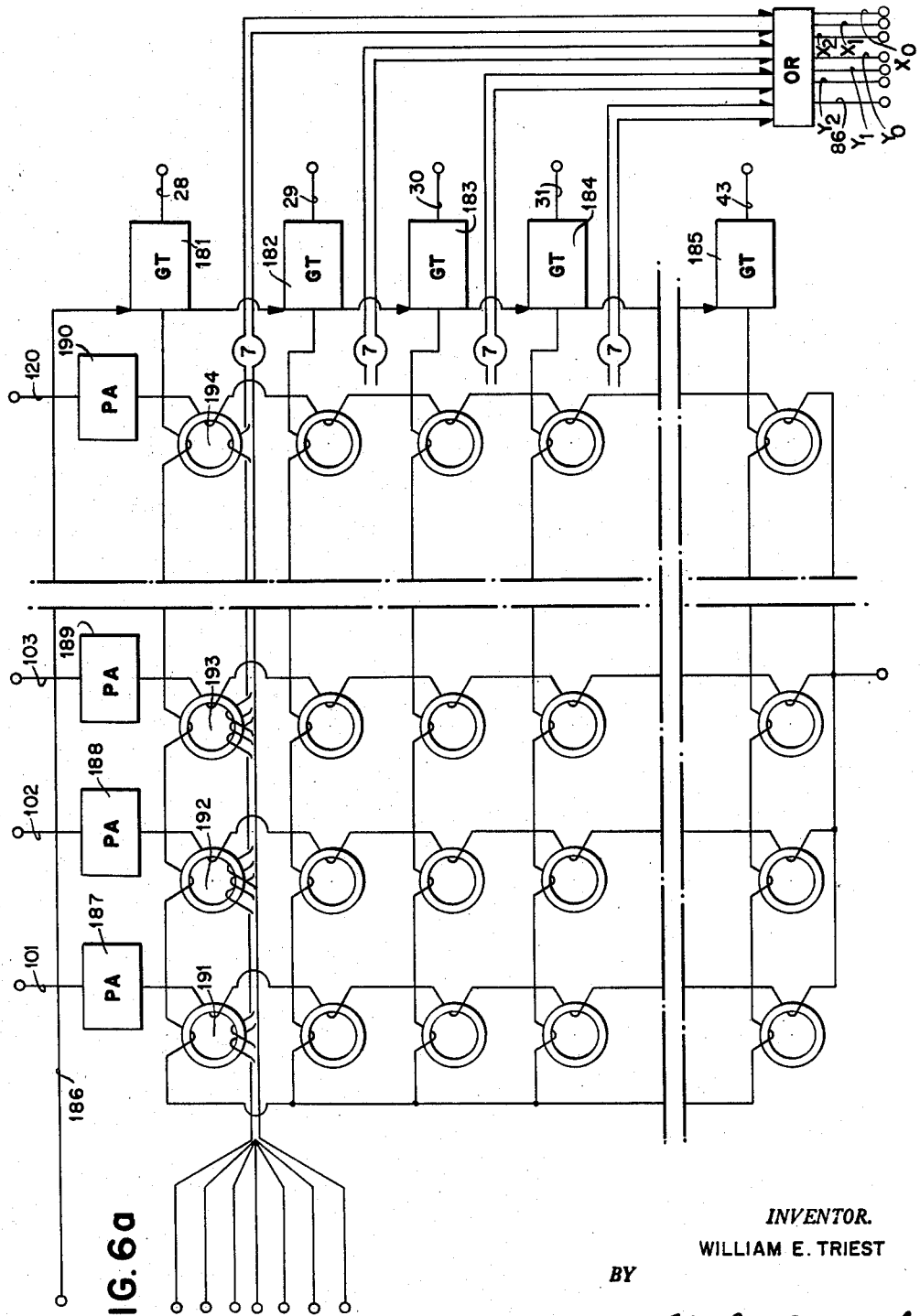
Fig. 6a illustrates in schematic form still another embodiment of the coding network which may be used in the character generator of Fig. 1.

Referring now to Fig. 6a, magnetic cores of the type having a high ratio of residual magnetization to magnetic saturation are employed in the coding network. The positive potential applied to the selected output line of the character selection network 19 serves to condition an associated gate circuit, illustrated as 181-185 inclusive. Prior to initiating operation of the ring circuit 56 in Fig. 1, a positive pulse is applied to a common grid input to the column of gate tubes 181—185 by means of conductor 186. Conductor 186 is energized by the ring control and synchronizing circuit 57 in Fig. 1 as will be more fully described hereinafter. The selected gate circuit applies a positive pulse to its associated row of cores to magnetize all of the cores in the row to the "1" remanence state. The remaining rows of cores in the network are set in the "0" remanence state by any suitable means not shown. The "1" and "0" states of remanence of magnetic cores is more fully explained hereinafter.

The signals on ring output conductors 101—120 are amplified through pulse amplifiers 187—190. The row of selected cores are, as noted, in the "1" remanence state, the remaining cores in the opposite or "0" remanence state. These cores are pulsed by the output of pulse amplifiers 187—190, the mmf. set up by this pulse being in such a direction as to reverse the remanence state of the cores from the "1" to the "0" state. While all cores in each column are pulsed, only the cores of the selected character will be affected, since the remaining cores are already in the "0" remanence state.

The seven signal conductors are threaded through or around each core in the network in the manner illustrated, seven separate conductors being required for each row. It is to be understood, however, that only seven output conductors may be used in the manner described with respect to Fig. 5a. As the ring circuit pulses each of the rows in sequence, the core representing the selected character in each row will be returned to the "0" state. All of the signal wires which are threaded through the selected cores will receive a "1" signal when the remanence state of the core is reversed, while those threaded around the core will receive a "0" signal. The pulses on conductors 111—130 are herein referred to as "reset" pulses, since they reset all the cores in the row representing the selected character from the "1" remanence state to the "0" remanence state. The voltage induced in the wires which are threaded through the cores representing the selected character are the result of the reversal of flux in the cores which have been reset. Upon completion of each cycle of the ring circuit, all cores in the network are then magnetized in the "0" remanence state.

The magnetic cores such as 191—194 in Fig. 6a are well-known in the art and are composed of a material having relatively high magnetic retentivity, and preferably a material having a hysteresis characteristic generally rectangular in shape, such as illustrated by a curve 200 in Fig. 6b, the abscissae are measured in units of magnetic field intensity, H, and the ordinates measured in magnetic flux density B. Materials having hysteresis characteristics similar to that illustrated by curve 200 are known to those skilled in the art, such materials in general being nickel-iron alloys which have been subjected to special processes of heat and magnetic treatment. A particularly desirable core material is ferrite, which has been especially processed to have generally rectangular hysteresis characteristics, it being well-known that ferrite also possesses high electrical resistivity and low eddy current loss properties.

As seen from curve 200 in Fig. 6b, a magnetic core may have only two states of residual magnetic flux. Because of the two possible states of residual flux, the magnetic core is properly termed a binary element, and by its residual flux states, may represent either a binary "1" or "0." These residual flux states are indicated by points 201 and 202, which denote residual flux in a positive direction and an opposite or negative direction, respectively. The hysteresis curbe 200 is preferably essentially rectangular in shape, the positive and negative residual flux densities at points 201 and 202 being relatively large percentages of the positive and negative saturation flux densities at ordinates 203 and 204 respectively. A positive surge of magnetomotive force momentarily drives the flux within the core to positive saturation at ordinate 203, thereafter leaving the residual flux in a positive flux direction at point 201 on curve 200. A negative source of magnetomotive force drives the flux within the core from the ordinate at point 201 to negative saturation at point 204 and leaves the residual flux in a negative flux direction at point 202. Thus a magnetomotive force pulse in the opposite direction to the original residual flux direction causes a large flux change within the core, reverses the direction of the residual flux and results in a voltage pulse being induced in the signal conductors threading the core. A magnetomotive force pulse applied in the same direction as the original residual flux direction, for practical purposes, produces no effect on the residual flux and causes little voltage to be induced in the conductors threading the core.

The gate circuits shown in block form in Fig. 6a as 181 through 185 are conventional and well-known in the art. Each line of cores representing a character has an associated gate circuit, but only the one associated with the selected core will be energized at any one time.

Figure 7 illustrates another embodiment of a magnetic core coding network to produce a series of seven signals varying in amplitude as a function of a predetermined code. In the previous embodiments using magnetic core coding networks, the seven signal outputs were obtained by selecting a row of cores and their associated signal conductors and treating them in a particular manner so as to produce coded output signals representing the selected character. In the embodiment illustrated in Fig. 8, the coding network comprises a single row of magnetic cores common to all characters, and an individual group of 7 signal conductors threaded throughout the row of cores for each character available for synthesis. Each group of 7 signal conductors has an associated group of diodes, one diode for each signal conductor, the diodes being biased at one of two signal levels according to whether or not the associated signal conductors represent the selected character.

The operation of the embodiment of Fig. 7 is as follows. The seven output conductors representing a particular character, available for synthesis, are common at one end, such as the character selected by conductor 28, and are threaded through or around the cores of the row in accordance with a predetermined code. The other end of these signal conductors is connected to the anodes of an associated diode, shown as 221-227 inclusive, the cathodes of which are connected through an associated load resistor, shown as 231-237 respectively, to a negative potential of −15 volts. It is assumed in the ensuing description that the signal conductors connected to character selection network output conductor 28 represent the selected character.

The character selection network 19 of Fig. 1 operates to apply a potential of −15 volts to the signal conductors associated with the selected character, and a potential of −30 volts to the signal conductors associated with the non-selected characters. As noted, the cathodes of all diodes are connected through an associated load resistor to a potential of −15 volts. The cathodes of the diodes associated with the non-selected characters therefore are biased 15 volts negative with respect to the anodes. On the other hand, the cathodes of the diodes associated with the selected character have a zero bias with respect to the anodes, since a potential of −15 volts is applied to the cathode as well as the anode of these diodes.

The ring circuit operates in the manner already disclosed, delivering a pulse to each stage of the ring in succession. As the triggers comprising said ring are rendered on successively, the output pulse from each stage of the ring appearing on conductors 101—120 is applied to one of the pulse amplifiers, shown as 211—214, the outputs of which are connected to associated core drivers 215—218 respectively. The output pulses from core drivers 215—218 are used to drive cores 231—234. These cores are of the type illustrated in Fig. 5, the operation of which has been previously described. A magnetomotive force applied to the cores in the form of a positive pulse from the core drivers results in a positive potential being induced in the conductors threaded through the core, this potential being in the order of magnitude of approximately +10 volts. As noted previously, no potential is induced in conductors threaded around the core.

Since the anodes of the diodes associated with the non-selected characters, such as diodes 235—241, are biased at −15 volts with respect to the cathode, any induced positive potential having a magnitude less than 15 volts will be unable to pass through these diodes. However, a positive potential induced in the conductors associated with the selected character will pass through their associated diodes to the coding network conductors, since the anodes of the diodes of the selected character have zero bias with respect to the cathode. Any combination of driving current and number of turns on the magnetic core within the magnetic saturation limits of the core may be employed to develop the required number of ampere turns to produce a change of flux which will cause a potential to be induced in the conductors threaded through the cores. For example, if the magnetic core employed is an F 109–3 type core of Ferramic H material manufactured by General Ceramics and Steatite Corporation, a maximum of 2.5 ampere turns may be employed without saturating the magnetic core.

Referring now to Fig. 8, there is illustrated in block schematic form the ring control and synchronizing circuit, shown in Fig. 1a as block 57. The ring control and synchronizing circuit comprises a combination of a pulse generator, flip-flop circuits, coincidence detectors or gate tube circuits and mixer circuits interconnected as illustrated. A convention of symbolism used throughout the drawings of the present invention, and more particularly in Fig. 8, is employed to distinguish between pulse and D.C. steady state inputs and outputs; a conventional arrow indicates a pulse, a diamond shaped arrow indicates a D.C. level.

As is well-known in the art, a flip-flop is a bistable switching device which operates so that it is always in one of two stable conditions, the switching from one stable condition to another being accomplished by means of short duration pulses applied to the inputs of the flip-flop circuit. The gate circuits shown in block form throughout Fig. 8 function as coincidence detectors or logical AND circuits having two inputs and a single output; a D.C. level applied to the lower left input in time coincidence with a positive pulse applied to the lower right input produces a positive pulse at the output terminal. The ring circuit will be assumed to be initially in the "clear" condition, in which case the flip-flops of each stage would be in the Off condition. If desirable, this could be ensured in a conventional manner by use of a reset pulse which would reset all flip-flops to the Off condition. In the normal condition, when no characters are being synthesized by the character generator, pulses will continuously be supplied by pulse generator 259 to one input of the gate tubes in each stage of the ring circuit through conductor 58. To begin the operation of character synthesis, a start pulse is applied from character generator control circuit 66, described in greater detail hereinafter, through conductor 90 to turn flip-flop 260 to the On condition, the output of flip-flop 260 in turn serves to condition gate circuit 261 through conductor 262. The start pulse from character generator control circuit 66 also passes through conductor 263 to turn flip-flop 264 to the On condition. The D.C. level output of flip-flop 264 is applied through conductor 265 to condition gate circuit 266, which will then emit an output pulse at the time of the next pulse supplied by pulse generator 259 through conductors 58, 267 and 268. The output pulse from gate circuit 266 is applied through conductor 270 to turn flip-flop 271 On. The output of flip-flop 271, in turn, conditions gate circuit 272 so that the next succeeding pulse from pulse generator 259, supplied to gate circuit 272 via conductors 58 and 267 will produce an output pulse on conductor 273. The same pulse which passes through gate circuit 266 to turn flip-flop 271 On cannot pass through gate circuit 272 because the transient rise time of establishing the On condition of flip-flop 271 is long compared with the time duration (or pulse width) of pulses from pulse generator 259. Hence, the pulse which turns On flip-flop 271 has terminated long before the output of the flip-flop 271 is sufficiently high to allow gating of pulses through gate circuit 272.

While it may initially appear that flip-flop 271 and gate circuit 272 are superfluous, the necessity for these components can be explained as due to the asynchronous nature of start pulses from the character generator control circuit 66 and pulses from pulse generator 259. It is possible that a start pulse would turn flip-flop 264 On and a pulse from pulse generator 259 would occur when the output of flip-flop 264 was intermediate between "On" and "Off" conditions, due to the delayed rise time of the flip-flop output. This might result in a pulse output from gate circuit 266 of insufficient amplitude. However, by allowing gate circuit 266 to trigger only flip-flop 271, operation of the starting circuit proceeds only after gate circuit 266 produces an output pulse sufficient to trigger flip-flop 271, whether its pulse input is of normal or less than normal amplitude.

The output of gate circuit 272 is a full amplitude pulse which is applied through conductor 273 to mixer 275. The mixer operates as a logical OR circuit, delivering a single output pulse for one or more inputs. The other input to mixer 275 is obtained from gate circuit 261 through conductor 276, and is applied from the ring circuit 56 (Fig. 1) through conductor 93 provided that gate circuit 261 is conditioned by the output from flip-flop 260.

Gate circuit 261 is controlled by character generator control circuit 66 (Fig. 1) through flip-flop 260. A start or stop pulse from the character generator control circuit 66 applied through conductors 90 or 92 serves to turn flip-flop 260 to the On or Off condition respectively.

Flip-flop 260 serves the function of being an "On" switch for the total time duration required for writing a sequence of characters under control of the character generator control circuit 66. In the On condition, flip-flop 260 supplies a D.C. output to condition gate circuit 261 so that successive cycles of the ring circuit 56 (Fig. 1) can be generated during this interval once operation of the ring circuit is initiated.

The output from mixer 275 is applied through conductor 278 to delay circuit 279. Delay circuit 279 provides a time delay between ring cycles of sufficient duration to permit the next one of conductors 28—43 to be selected by character generator control circuit 66 prior to initiation of the next ring cycle. A time delay of the order of 3 microseconds has been found to be adequate using the circuits illustrated herein.

The pulse applied by mixer 275 through delay unit 279 is applied through conductor 85 to turn the first flip-flop of the ring circuit to the On condition, and thereby initiate a ring cycle as will be described hereinafter. The output pulse from mixer 275 also restores flip-flops 264 and 271 to the Off condition through conductor 281. Mixer 275 also provides an output on conductor 186 which is employed to pulse gate circuits 181—185 illustrated and described with reference to Fig. 6a.

Referring now to Fig. 9, there is illustrated in block schematic form the character generator control circuit shown as block 66 in Fig. 1. The character generator control circuit is employed to perform the following functions:

(1) Provide a start pulse to initiate operation of the character generator.

(2) Maintain a count of the characters per line and number of lines of characters generated.

(3) Provide D.C. level outputs from counters to circuits which generate deflection potentials for positioning characters (character spacing and line spacing).

(4) Generate voltages for selecting, in the proper sequence, characters to be generated.

(5) Provide a stop pulse after a predetermined number of lines and characters per line have been generated.

The character generator control circuit shown in Fig. 9 is one designed to generate two lines of characters, each line having four characters, and is illustrative of the basic principle employed to generate a number of lines, each of the lines containing a plurality of characters, both the number of lines and the number of characters per line being predetermined.

In the general application, the character generator control circuit will usually require two sets of counters, one for counting lines of characters and the second for counting characters per line. The flip-flops, gate circuits or coincidence detectors and mixers used in the control circuit of Fig. 9 are the same as those described with respect to Fig. 8 with the exception of flip-flop 300. Flip-flop 300 is of the type that produces a positive and negative D.C. level on its output conductors, the polarity of the output levels depending on the state of the flip-flop. In the ensuing discussion, coincidence detectors will be referred to as CD.

As shown, the character generator control circuit includes a four stage horizontal counter consisting of flip-flop 301—304, mixers 305—308 and coincidence detectors 309—312 inclusive which provide a sequence of D.C. level outputs on conductors $X_a$, $X_b$, $X_c$ and $X_d$. The horizontal counter provides a count of the number of characters per line. Flip-flop 300 is a scale of two counter which provides two D.C. level outputs on conductors $Y_a$ and $Y_b$, which serve to count the number of lines of characters to be generated, the number being limited to two in the illustrated circuit.

The operation of the character generator is initiated by a start pulse from pulse generator 88 (Fig. 1), which passes through conductor 94 and mixer 305 to turn flip-flop 301 to the On condition while turning flip-flops 302, 303 and 304 to the Off condition through mixers 306, 307 and 308 respectively. Pulses on conductor 94 are also applied to CD's 315 and 316. However, only one of these CD's will be conditioned, depending on whether toggle switch 318 is set on the "one" line position at terminal 319 or the "two line" position at terminal 320. Toggle switch 318 applies zero or ground potential to condition the selected CD 315 or 316 through an associated conductor 322 or 323 respectively. The non-selected CD has a negative D.C. bias of 30 volts applied thereto from terminal 325 through resistor 326 or 327. Thus, depending on whether toggle switch 318 is set at terminal 319 or 320, CD 315 or 316 will be conditioned to pass the start pulse on conductor 94 to output conductor 330 or 331, while the other CD is inhibited from conducting by the negative bias from terminal 325.

Assuming that two lines of characters are to be generated, toggle switch 318 is in the "two lines" position at terminal 320, the gated start pulse on output conductor 330 of CD 315 turns flip-flop 300 on the On condition. Flip-flop 300 is identical in operation to the remaining flip-flops employed throughout the character generator control circuit, but differs in employing two outputs. A positive pulse applied to the lower left input is said to turn the flip-flop On, resulting in a high D.C. level at output conductor 348 and a low D.C. level at output conductor 354; a positive pulse applied to the other input terminal is said to turn the flip-flop Off, resulting in a reversal of D.C. levels at output terminals 348 and 354. When line position switch 318 is in the "two line" position at terminal 320, flip-flop 300 is turned On by the start pulse on conductor 94, and conditions CD 337 through conductor 349. CD 309 is conditioned by the output from flip-flop 304, which occurs only after a complete line or row of characters has been synthesized. The next counter advance pulse on conductor 91 is gated through CD 309 and applied to CD 346 through conductor 347. The pulse output of CD 309 also turns flip-flop 300 Off in the manner described above to provide the D.C. level to condition CD 346 through conductor 354. CD 309 is conditioned by the output of flip-flop 304, while CD's 310—312 are conditioned by the outputs of flip-flops 301—303 respectively. As already noted, only one of flip-flops 301—304 will be On at any one time, so only its associated CD will be conditioned. As the ring is cycled through its 20 stages, the counter advance pulse applied at the end of each cycle to conductor 91 will be gated through the conditioned one of CD's 309—312, which in turn applies a pulse to turn the associated one of the flip-flops 301—304 to the On condition. Flip-flops 302—304 will be turned on directly by CD's 310—312 through conductors 332—334 respectively, while flip-flop 301 will be turned on through conductor 336, CD 337, conductor 338, mixer 305 and conductor 339. CD 337 is in turn conditioned by flip-flop 300 if another line of characters is to be generated. CD 310 also turns flip-flop 301 Off directly through conductors 332 and 340, while coincidence detectors 311 and 312 turn off flip-flops 302 and 303 through conductors 333 and 334, mixers 306 and 307 and conductors 341 and 342 respectively. CD 309 turns flip-flop 304 Off through conductor 336, CD 337, conductor 343, mixer 308 and conductor 344. Mixers 305—308 also serve to reset the horizontal counters prior to initiating the process of character synthesis by a start character generator pulse from conductor 90.

When generation of the first line of 4 characters has been completed, flip-flops 301—303 are Off while flip-flop 304 is On, the latter serving to condition CD 309 through conductor 345. The next counter advance pulse on conductor 91 will then be gated through CD 309 to CD's 337 and 346 through conductors 336 and 347 respectively. Coincidence detector 337 has been conditioned by flip-flop 300 through conductors 348 and 349, so that the counter advance pulse on conductor 91 is gated through CD 309 and CD 337 to output conductor 338 to perform three distinct functions. The pulse turns flip-flop 304 Off, and flip-flop 301 On through circuits already noted. In addition, flip-flop 300 is turned Off through conductor 351, mixer 352 and conductor 353. When flip-flop 300 is turned Off, the positive D.C. level on output conductor 354 conditions CD 346. CD 346 in turn operates as described below to apply a stop character generator pulse to conductor 92 after the second line of four characters has been generated.

The circuit operation, which ensures that the stop character generator pulse emitted by CD 346 to conductor 92, occurs only after the desired number of characters has been synthesized, and operates in the following manner.

The counter advance pulse from the last stage of the ring circuit is applied to CD's 309–312 through conductor 91, this pulse indicating the completion of synthesis of a single character. However, flip-flop 300 has an inherent delay in the order of .3 to .5 microsecond before changing its state, while the pulse from the last stage of the ring is of only .1 microsecond duration. Thus, by the time the D.C. input from flip-flop 300 conditions CD 346, the pulse input is no longer present. CD 346 remains conditioned, however, so that at the end of the synthesis of the second line of characters, the next counter advance pulse applied to CD 346 causes a stop character generator signal to be emitted at conductors 92. The stop character generator signal causes the character generator to stop in the manner discussed with respect to Fig. 8.

If only a single line of characters is to be generated, line selection switch 318 will be in the "one line" position at terminal 319, which conditions CD 316 through conductor 323. The start pulse applied to conductor 94 will be connected to CD 316 through conductor 355. The output pulse from CD 316 turns flip-flop 300 to the Off condition through conductor 331, mixer 352 and conductor 353. Output conductor 354 of flip-flop 300 will in turn condition CD 346 through conductor 356. The circuit then operates in the identical manner as described above with respect to the second line of characters generated to apply a stop character generator pulse to conductor 92. The X and Y output conductors $X_a$, $X_b$, $X_c$, $X_d$, $Y_a$ and $Y_b$ are also employed as deflection potentials in a manner described hereinafter.

Figure 10:
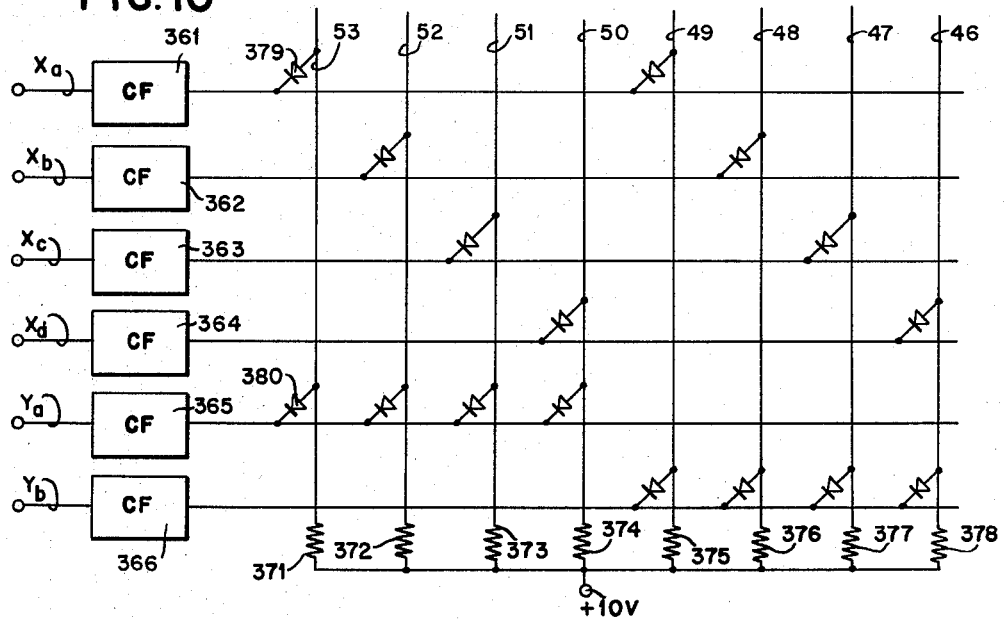
Fig. 10 is a wiring diagram of the sequence switch identified as block 45 in Fig. 1.

Referring to Fig. 10, there is illustrated therein a logical diagram of the sequence switch shown as block 45 in Fig. 1. The sequence switch is a diode switching circuit which operates to selectively apply a relatively positive D.C. potential on one of output conductors 46—53 in response to coded input signals. The D.C. output levels from the flip-flops employed in horizontal and vertical counters which supply the X and Y input potentials are 0 or −20 volts when the flip-flop is in the On or Off condition respectively. The sequence switching network basically comprises a plurality of positive AND circuits, one circuit for each of the eight output conductors 46–53, each circuit including a pair of diodes and an associated load resistor. Cathode followers 361 through 366 function as low impedance sources to operate the logical AND circuits. Load resistors 371—378 are connected to a common source of positive potential on one end, while the other end is connected to the anodes of a pair of diodes. The load resistance is much higher than the forward conduction resistance of the diodes, being in an order of amplitude of 51K as compared to a nominal diode forward resistance of 100 ohms. The anodes of all the diodes in a logical AND circuit are slightly more positive than the most negative cathode. Thus, for a D.C. zero voltage output on one of conductors 46-53, both associated cathodes must have a zero input, while for a negative output of any of conductors 46-53 either or both associated diodes must have a negative input of −20 volts. Output conductor 53, for example, is connected to the anodes of diodes 379 and 380, the cathodes of which are connected to input lines $X_a$ and $Y_a$. Thus, when both $X_a$ and $Y_a$ are at a D.C. input level of 0 volts, the output potential of conductor 53 is zero volts; if neither $X_a$ or $Y_a$ or both are at a level of −20 volts, the output level at conductor 53 is −20 volts. Since only one X and one Y input conductor will be at a D.C. level of zero volts at any one time, only one of output conductors 46–53 can be 0, the others being −20 volts. A potential on the order of zero volts or higher is required to condition logical AND circuits shown as 9—16 in Fig. 1. Thus only the output conductor having both associated diodes at a zero potential will provide the potential necessary to condition the selected one of AND circuits 9—16 and thereby provide read in to buffer register 18 through the associated load resistor.

As is well-known in the electrical art, the point upon the fluorescent screen of a CRT at which an electron beam impinges is controlled by voltages applied to the horizontal and vertical deflection system of the CRT. In the apparatus herein described, signals on conductors $X_a$, $X_b$, $X_c$, $X_d$, $Y_a$ and $Y_b$, are applied to X and Y mixers shown in Fig. 1 as blocks 62 and 63 respectively. The X and Y output signals from digital to analog decoders 60 and 61 constitute the second input to the X and Y mixers. The resultant output potentials from the X and Y mixer circuits 62 and 63 provide both character generation and character positioning potentials for positioning a character with respect to the X and Y axis of the CRT.

Figure 11A:
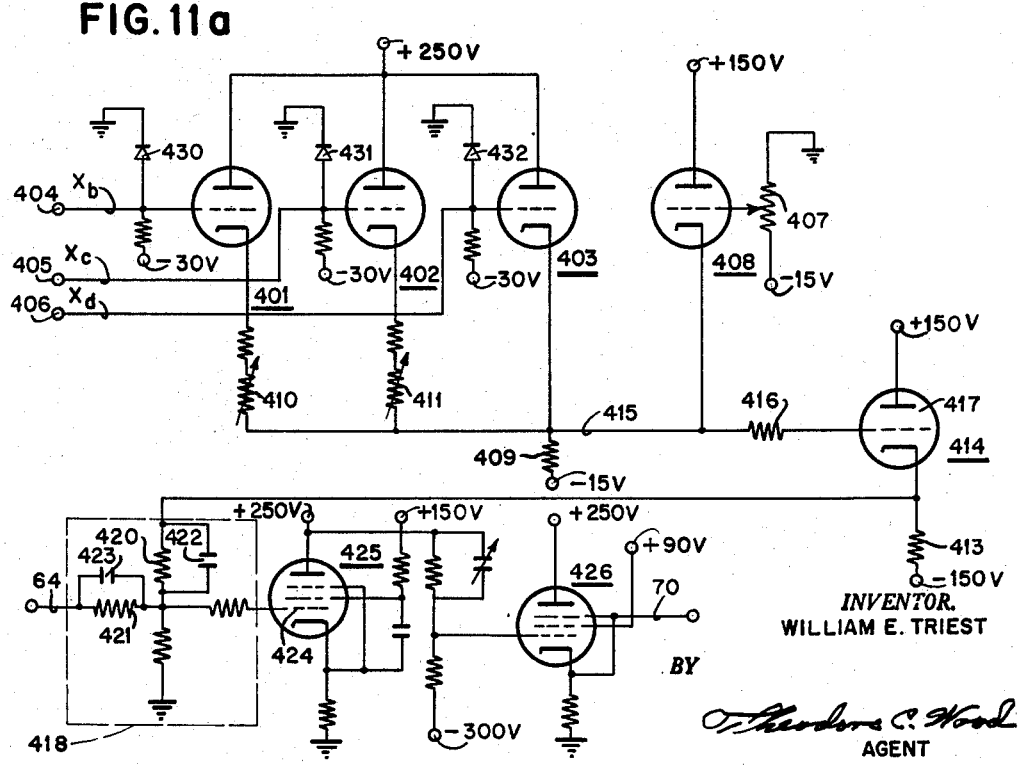
Fig. 11(a) illustrates in schematic form the mixing circuit, identified as block 62 in Fig. 1.
Figure 11B:
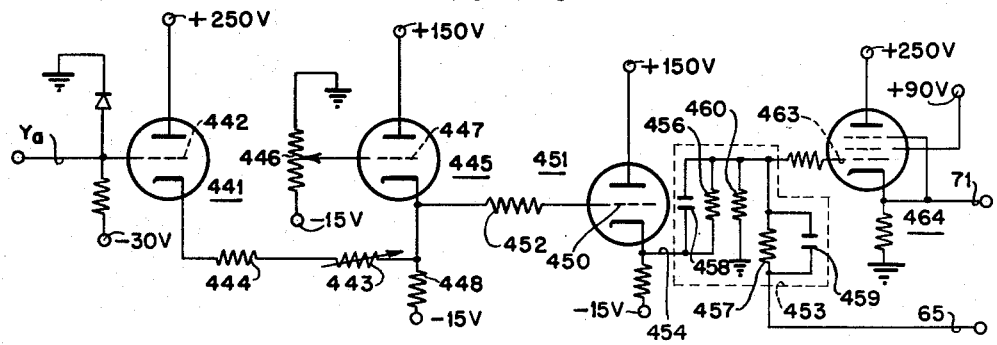
Fig. 11(b) illustrates in schematic form the mixing circuit identified as 63 in Fig. 1.

The X and Y mixers are illustrated in schematic form in Figures 11a and 11b respectively. Each mixer comprises input circuits for the signals to be mixed, a resistance mixing network and an amplifier circuit to raise the potential level of the resultant potentials.

Referring specifically to Fig. 11a, the X mixer illustrated therein comprises cathode followers 401, 402 and 403 having input terminals 404, 405 and 406 to which potentials $X_b$, $X_c$ and $X_d$ respectively, are applied. The cathode follower circuits are utilized to provide binary weighted output potentials for the associated signal inputs $X_b$, $X_c$ and $X_d$ respectively in a manner to be herein described. The resultant potential from the binary weighting is a D.C. level equal in duration to the time required to generate a character. The $X_a$ potential is not applied to X mixer 62. However, the positioning of the character when $X_a$ is energized is determined by adjusting potentiometer 407 in cathode follower 408 when $X_b$, $X_c$ and $X_d$ are not energized. Diodes 430–432 associated with cathode followers 401–403 respectively are used to prevent the input signal level from rising above zero or ground potential. Cathode follower 403 utilizes common output resistor 409 to provide the positive signal level for $X_d$, while cathode followers 401 and 402 include variable cathode resistors 410 and 411 to adjust the signal level of $X_b$ and $X_c$ respectively to intermediate levels between $X_a$ and $X_d$.

Figure 12:
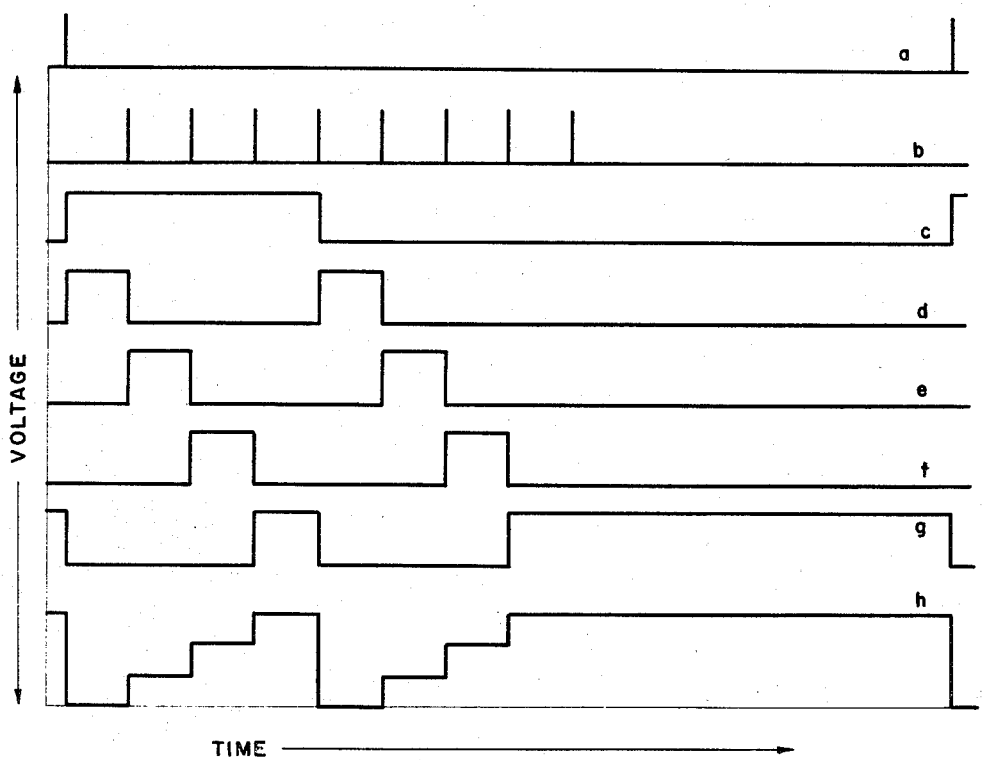
Fig. 12 shows a family of curves illustrating the X and Y positioning potentials produced by the character generator control circuit, identified as 66 in Fig. 1.

Referring now to Fig. 12, curves d, e, f and g illustrate the $X_a$, $X_b$, $X_c$ and $X_d$ input potentials to the mixing circuit in the sequence at which they occur. As shown, the waveforms are identical in amplitude and duration and differ only in the sequence at which they occur due to the serial operation of the horizontal counter wherein the waveforms are developed. Curve h illustrates the binary weighted output potential developed across cathode resistor 413 of cathode follower 414 (Fig. 11a).

Referring again to Fig. 11a, the four output signals $X_a$ through $X_d$ are combined at common cathode resistor 409 to form the horizontal positioning potential. The resultant potential developed across resistor 409 is then applied through conductor 415 and resistor 416 to control grid 417 of cathode follower 414. Cathode follower 414 is used to provide a low impedance circuit to supply the resultant potentials to mixing circuit 418.

Mixing circuit 418 is a resistance-capacitance network which sums the horizontal positioning potentials $X_a$—$X_d$ and the output signals from the X decoder to obtain the deflection potential applied to the CRT deflecting system. As already described, the X decoder output varies as a function of the predetermined X coded address, and is applied through conductor 64 to mixing circuit 418. The mixing network, comprising resistors 420 and 421 and compensating capacitors 422 and 423, is a potential summing network of the type described in "Waveforms," M.I.T. Radiation Laboratory Series, vol. 19 published by McGraw-Hill, 1949, pages 18 and 19. The sum of the input potentials are applied to control grid 424 of amplifier 425. The resultant potential from amplifier 425 is applied to cathode follower stage 426, which provides a low impedance output through conductor 70 to horizontal deflection amplifier 72.

The potential applied to the horizontal deflection system of the CRT is a composite of two signals, the horizontal positioning signals $X_a$ through $X_d$, and the binary weighted signals from the X decoder. This resultant deflection potential has a waveform consisting of the horizontal staircase voltage, such as shown in curve h of Fig. 12, each step of the staircase voltage having superimposed thereupon the X decoder output for a selected character. The difference in potential between the highest point of any step in the staircase waveform representing a character and the base of the succeeding step in the staircase waveform representing a succeeding character is the horizontal positioning voltage which provides the necessary horizontal spacing separating the successive characters. The waveform of the final X deflection voltage for eight characters consists of curve h of Fig. 12 with the 20 step digital-to-analog converter output for the selected characters being superimposed thereupon to provide a series of potentials to position two lines of 4 characters each. The staircase waveform determines the horizontal position of the area in which the character is to be written, while the decoder output superimposed on this waveform defines the X component of the spots within the area.

Referring now to Fig. 11b, there is illustrated therein a schematic diagram of the Y mixer, which operates in a manner similar to the X mixer circuit to provide two output levels or steps in the vertical staircase voltage. Only two levels are employed, since the control circuit previously described with respect to Fig. 1 dictates the synthesis of only two lines of characters as illustrative of the principle of operation of the present apparatus. However, the number of steps in the vertical staircase voltage will vary directly as the number of lines to be generated, and may be extended to any required number of lines, limited only by the available space for displaying characters on the face of the tube.

The Y mixing circuit comprises cathode follower 441 having a control grid 442 to which the $Y_a$ input is applied. The cathode resistance includes variable resistor 443 together with resistor 444. Cathode follower 445 together with potentiometer 446 connected to control grid 447 operates to adjust the lower output or reference level of the Y staircase voltage $Y_b$. The output from cathode followers 441 and 445 developed across common cathode resistor 448 is connected to grid 450 of cathode follower 451 through coupling resistor 452. Cathode follower 451 provides a low impedance input to mixing network 453. The other input to the mixing network is the output of the Y decoder, which is applied to the mixing network through conductor 65. The mixing network 453 comprising resistors 456 and 457 and their associated variable capacitors 458 and 459 operates in the same manner described with reference to mixing circuit of Fig. 11a to produce an output potential which is a composite of the two input potentials. This composite potential is developed across resistor 460 and is applied through coupling resistor 462 to control grid 463 of cathode follower 464, which is used to provide a low impedance output on conductor 71.

Referring to Fig. 12, the eight curves "a" through "h" thereof illustrate the timing relationship of the positioning voltages $X_a$, $X_b$, $X_c$, $X_d$, $Y_a$ and $Y_b$.

The waveforms are those generated when the character generator control circuit is set to produce two lines of four characters each.

Curve "a" of Figure 12 illustrates the start pulse which initiates operation of character generator to produce two lines of four characters per line. This pulse is supplied in a manner previously described each time the process of character synthesis is initiated.

Curve "b" of Fig. 12 illustrates the counter advance pulses from the last stage of the character generator ring applied to conductor 91 (Fig. 1), which conditions the control circuit to permit generation of the succeeding character. The frequency of these pulses is such that a complete ring cycle occurs in the interval between the generation of these pulses, or is one-twentieth of the frequency of the ring circuit.

Curve "c" of Fig. 12 illustrates the vertical positioning voltage shown as the $Y_a$ and $Y_b$ outputs from scale of two counter 551 illustrated in Fig. 10, the lower or reference line representing $Y_b$ and the upper $Y_a$. Since only two lines of characters are generated, two potential levels are sufficient to position both lines on the screen when the potentials are applied to the vertical deflection plates of the CRT.

Curves "d," "e," "f" and "g" of Fig. 12 illustrate the positioning signals $X_a$, $X_b$, $X_c$ and $X_d$, which have been previously described with reference to Fig. 11a.

Fig. 13 illustrates in simplified block schematic form, the ring circuit used to provide the pulse source to actuate the X and Y coding network in a manner hereinbefore described. The ring circuit basically comprises a plurality of sequentially coupled flip-flops, wherein the flip-flops are rendered On successively by suitable successive voltage pulses. For ease of illustration, only the first 3 and the last 2 stages of the ring circuit have been shown in Fig. 13. With respect to the apparatus herein described, the ring circuit comprises gate circuits 501—505 each controlling an associated flip-flop 506—510, the combination of a single gate tube and its associated flip-flop comprising one stage of the ring circuit.

With respect to the flip-flops employed in the ring circuit, flip-flops are shown as having two inputs and a single output. By the convention employed herein, a positive pulse applied to the Set input terminal is said to turn the flip-flop On, producing a positive D.C. level at the output; a positive pulse applied to the Clear input terminal is said to turn the flip-flop Off, producing a negative D.C. level at the output.

The ring circuit operation is initiated by the ring control and synchronizing circuit 57 (Fig. 1) which provides a starting pulse on conductor 85 to turn flip-flop 506 On. The positive D.C. level output of flip-flop 506 is applied through conductor 511 to condition gate circuit 502. Upon receipt of the next ring driving pulse on conductor 58, buffer amplifier 513 passes the pulse on conductor 514 to the input of gate circuit 502. The gate circuit 502 having been conditioned by the output of flip-flop 506, passes the pulse to thereby turn flip-flop 507 On through conductor 515, and turn flip-flop 507 Off through conductor 516. The operation of the ring circuit then proceeds sequentially, rendering the successive flip-flops On through their associated gate tubes. Each of the flip-flops conditions the succeeding gate tube, which then passes the succeeding pulse on conductor 58. When the operation of the ring circuit reaches the 20th or final stage, the output from gate circuit 505 turns flip-flop 510 On and flip-flop 509 Off. The output of flip-flop 510 conditions gate circuit 501 through conductor 520. The next pulse on conductor 58 will be passed by gate circuit 501 to ring control and synchronizing circuit 57 (Fig. 1) through conductor 93. If the ring is to be recycled, ring control and synchronizing circuit 57 will emit another pulse on conductor 85 to thereby recycle the ring. As earlier noted, the ring circuit of 20 stages is assumed adequate to write any character in a 7 x 5 matrix. From the above description, it is noted that the only limitation on the speed of operation of the ring circuit is the rate of pulses applied to conductor 58 which may be, for example, 500 kc., at which speed a 20 stage ring circuit may complete a cycle in 40 microseconds. The outputs 101—120 from the associated flip-flops 506—510 are the outputs from the ring circuit 56 in Fig. 1, these outputs being used to drive the coding network in the manner already described.

It is noted that the pulses applied to conductor 58 operate through one of three buffer amplifiers, only two of which are shown as 512 and 513. Buffer amplifiers 512 and 513 operate to raise the output level of the ring driving pulses on conductor 58 to the level required to drive the associated gate tubes. As used here, a buffer amplifier is a coincidence detector having a constant level D.C. voltage applied to the suppressor grid.

While one particular embodiment has been shown as illustrative of a particular ring circuit which may be employed, it is understood by those skilled in the art that any ring circuit such as, for example, the Overbeck Ring, shown in U.S. Patent 2,404,918 or the Leslie Ring, described in the August 1948 issue of the Proceedings of the IRE, may be substituted.

Figure 14:
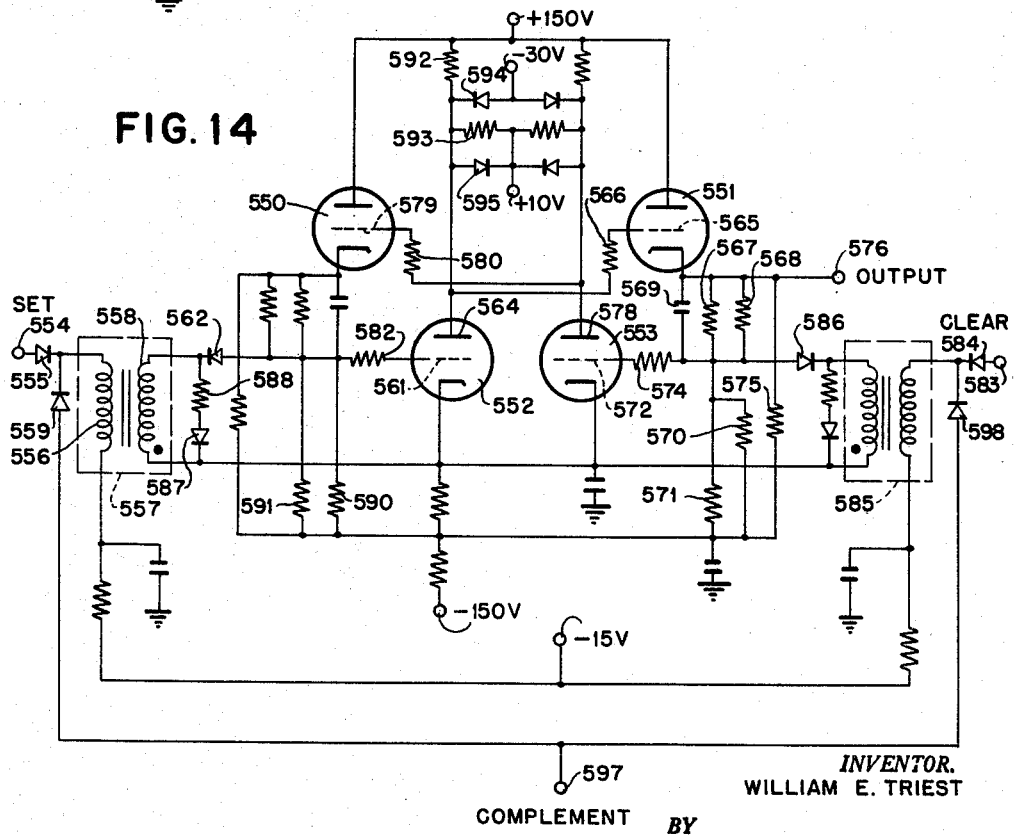
Fig. 14 is a detailed wiring diagram of the high-speed flip-flop employed in the character generator illustrated in Fig. 1.
Figure 16:
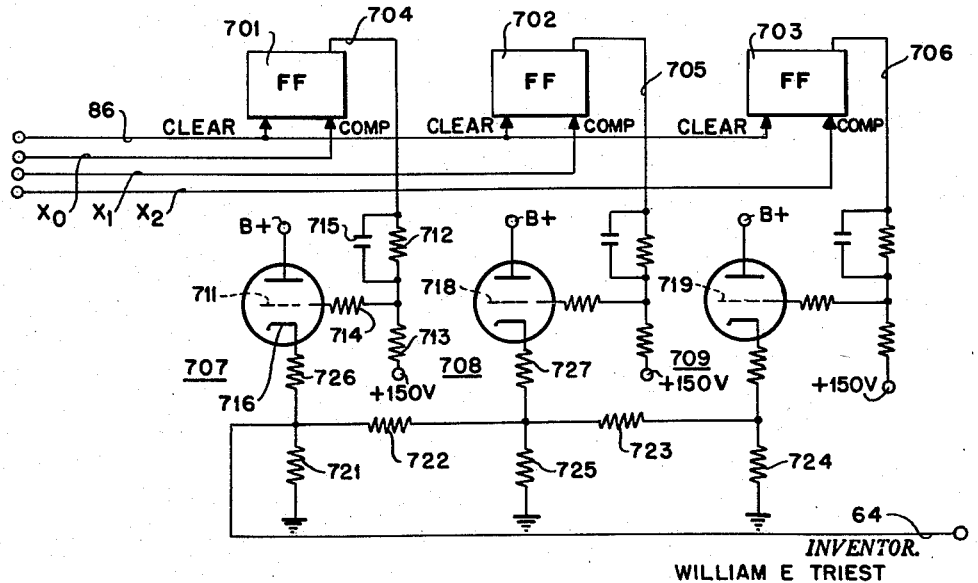
Fig. 16 illustrates in simplified schematic form the decoder identified as block 60 in Fig. 1.

Referring now to Fig. 14, there is illustrated therein a schematic diagram of a flip-flop circuit of the type employed in the ring circuit (Fig. 13) and the decoders (Fig. 16). The flip-flops employed in other circuits in Fig. 1 may be of conventional design, since their speed of operation is not critical.

The flip-flop herein described employs two inputs and a single output. A positive pulse applied to the Set input terminal shown on the left of the block diagram produces a positive D.C. level at the output, while a positive pulse applied to the right or Clear input terminal produces a negative D.C. level at the output. By the convention employed herein, the positive pulse applied to the Set input terminal is said to turn the flip-flop On, while the positive pulse applied to the Clear input terminal is said to turn the flip-flop Off.

Referring now to the schematic diagram of the flip-flop circuit, tubes 550 and 551 together with their associated circuits function as cathode followers, while tubes 552 and 553 function as trigger tubes. The function performed by those cathode followers is to drive the input capacity of trigger tubes 552 and 553. The flip-flop may be considered as comprising two identical circuits, each circuit including a trigger tube, a cathode follower and associated circuits. It is believed that a detailed description of one of such circuits and its mode of operation, together with a more general description of the remaining circuitry, is sufficient for an understanding of the flip-flop circuit. With respect to the ensuing description, it is assumed that the flip-flop circuit initially is in the Off condition, which, by the convention employed herein, indicates that trigger tubes 552 and 553 are in the conducting and non-conducting states, respectively.

When a positive pulse is applied to the Set input terminal 554, it passes through a diode 555 to a primary winding 556 of a transformer 557 resulting in a negative pulse being induced in the secondary winding 558 of the transformer. The pulse is prevented from going to trigger tube 553, however, by the high back resistance of diode 559. When trigger tube 552 is conducting, control grid 561 draws sufficient grid current to raise the grid bias to approximately zero with respect to the cathode. Since diode 562 is positioned in a loop between grid and cathode of trigger tube 552, it also has a zero potential produced thereacross when trigger tube 552 is conducting. Transformer secondary winding 558 is connected directly to the cathode of diode 562, so that the induced negative pulse is enabled to pass through the diode to control grid 561 of trigger tube 552. The induced pulse is of sufficient amplitude to cause trigger tube 552 to cut off, which in turn causes trigger tube 553 to conduct in a manner described subsequently, thereby reversing the state of the flip-flop circuit to the On condition. Anode 564 of trigger tube 552 is coupled to control grid 565 of cathode follower tube 551 through resistor 566. As trigger tube 552 is cut off, its rising anode potential is applied directly to control grid 565 of cathode follower tube 551, resulting in a corresponding rise in the cathode follower output. The cathode impedance of cathode follower 551 comprises a network including parallel connected resistors 567 and 568 and capacitor 569 in series with the parallel combination of resistors 570 and 571. Capacitor 569 is a compensating capacitor for trigger tube 553. The resistance elements in the above configuration constitute a voltage divider network used to control the bias on control grid 572 of trigger tube 553, the control grid 572 being tapped from the voltage divider network through resistor 574. The bias on control grid 572 of trigger tube 553 maintains trigger tube 553 cut off when trigger tube 552 is conducting. Resistor 575, bridged across the cathode impedance network, provides the correct output load for cathode follower 551. Terminal 576 is the output terminal of the flip-flop circuit.

As the output from the anode circuit of trigger tube 552 rises, the resultant increased output from cathode follower tube 551 is applied to control grid 572 of trigger tube 553 in the manner described above. This applied potential overcomes the negative bias on trigger tube 553, causing its anode potential to decrease as current conduction increases. Anode 578 of trigger tube 553 is connected to control grid 579 of cathode follower tube 550 through resistor 580, the lowered anode potential resulting in a decreased output from cathode follower tube 550. The output from cathode follower tube 550 is tapped to control grid 561 of trigger tube 552 through resistor 582. The decreased output from cathode follower 550 results in a negative bias being applied to control grid 561 of trigger tube 552 to maintain the trigger tube 552 in its cut-off condition.

While the operation described above illustrates a change from the Off to On condition of the flip-flop circuit, the switching from the On to the Off condition is accomplished similarly but in a reverse direction with respect to the trigger tubes and cathode followers. A positive pulse applied to the Clear input terminal 583 passes through diode 584 to transformer 585 where it is inverted before being applied to the cathode of diode 586. Since trigger tube 553 is conducting, a zero potential exists across diode 586. The negative pulse therefore passes through diode 586 and resistor 574 to control grid 572 of trigger tube 553, causing trigger tube 553 to be cut off. The lowered conduction of trigger tube 553 results in an increase of positive potential appearing on anode 578. This change of potential is applied to control grid 579 of cathode follower 550, producing a corresponding increase of positive potential at the cathode follower output. The output of cathode follower 550 is in turn applied to control grid 561 of trigger tube 552, causing trigger tube 552 to conduct, resulting in a decrease of positive potential at anode 564. This lowered potential is then applied to control grid 565 of cathode follower 551. The decreased output from the cathode follower 551 is then coupled to control grid 572 of trigger tube 553 to maintain trigger tube 553 in the cut-off condition.

The operation of the flip-flop circuit is briefly summarized as follows: a positive pulse applied to the Set terminal 554 produces a high D.C. level at output terminal 576, while a positive pulse applied to Clear input terminal 583 produces a low D.C. level at output terminal 576. The combination of resistor 588 and diode 589 across secondary winding 558 of transformer 557 is a damping network to prevent transformer 557 from oscillating. Resistors 590 and 591 associated with trigger tube 552 are identical in function to resistors 570 and 571 respectively associated with trigger tube 553. Resistors 592 and 593 together with diodes 594 and 595 are connected in the anode circuit of trigger tube 552, as shown. The function of diodes 594 and 595 is to clamp the output level to 30 volts negative when trigger tube 552, is conducting, and to clamp the output level to 10 volts positive when trigger tube 552 is cut off. The output level at output terminal 576 is thereby constrained between the levels of +10 and −30 volts, depending on the state of trigger tube 552. Grid resistors 582, 566, 574 and 580 serve to inhibit parasitic oscillations. While output levels of +10 and −30 volts are employed, it is believed obvious that any output levels may be substituted depending on circuit requirements.

A third input terminal 597, which is not employed in the ring circuit 56 of Fig. 1 but is utilized in the digital-to-analog decoders 60 and 61 of Fig. 1, is known as the complement input terminal. A positive pulse applied to terminal 597 of the flip-flop, also referred to as complementing the flip-flop, reverses the existing conduction state of the flip-flop circuit to its opposite conduction state.

When a positive pulse is applied to terminal 597, it passes through separate paths including diodes 559 and 598 and transformers 557 and 585, respectively, where pulse inversion takes place. The negative pulses are applied to the cathodes of diodes 562 and 586, which are associated wtih the grid circuits of trigger tubes 552 and 553, respectively. These diodes function as pulse isolating diodes to reduce the magnitude of the input pulse reaching the grid of the non-conducting trigger tube of the flip-flop circuit. As already noted, a zero potential exists across the diode associated with the conducting trigger tube, while a negative potential below cut-off exists across the diode associated with the non-conducting trigger tube. Assuming the flip-flop circuit is Off i.e., trigger tube 552 is conducting, the above negative pulse establishes negative voltages of equal amplitude on the cathodes of diodes 562 and 586. Since a zero voltage exists on grid 561 at the instant the negative pulse is applied, and since a negative voltage below cut-off exists on grid 572, the grid 572 is driven further below cut-off with a potential of relatively small magnitude, whereas the grid 561 is driven below cut-off with a potential of relatively large magnitude. However, as current conduction in trigger tube 552 decreases, its positively rising anode potential is applied through cathode follower tube 551 to grid 572 of trigger tube 553, thereby causing the voltage on grid 572 to increase in the positive direction. Thus trigger tubes 552 and 553 are rendered non-conducting and conducting, respectively, and the state of the flip-flop is rapidly reversed. The pulse duration is short relative to the time required to reverse the conduction state of the flip-flop 553. Once initiated, the change in state continues until completion. If the flip-flop circuit is On and trigger tube 553 is conducting when the complement pulse is applied, the flip-flop circuit operates in an identical manner to cut off trigger tube 553, thereby reversing its state to the Off condition.

From the above discussion, it is evident that when the flip-flop is in one of its bi-stable states, a positive pulse applied to the input terminal of the non-conducting tube has no effect. On the other hand, a positive pulse applied to the complement input always reverses the existing state of the flip-flop.

Figure 15:
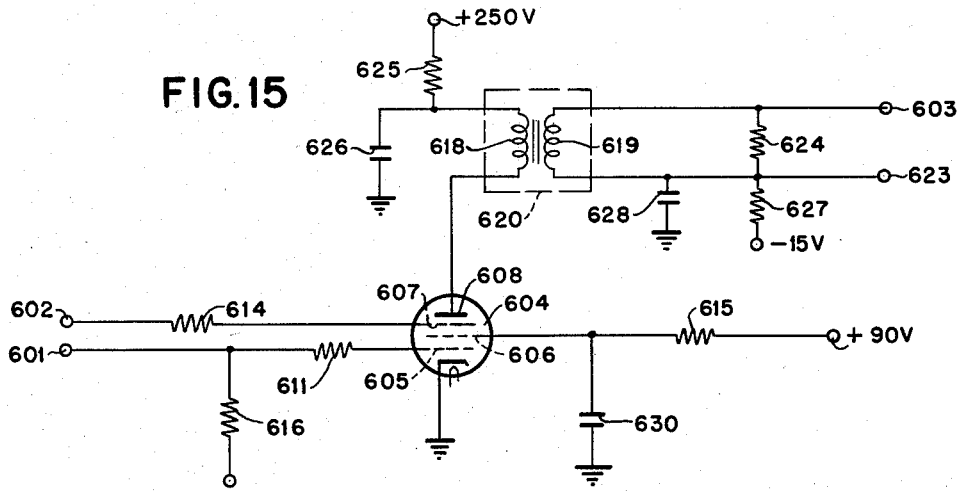
Fig. 15 is a detailed wiring diagram of the gate circuit used in the ring circuit of Fig. 1.

Fig. 15 illustrates in schematic form the gate circuit employed in the ring circuit 56 of Fig. 1. The ring circuit is also shown in more detail in Fig. 13. The gate circuit herein described is a vacuum tube AND circuit which has two inputs, i.e., a pulse applied to terminal 601 and a D.C. level applied to terminal 602 effects energization of the control grid and suppressor grid, respectively. An output pulse, equal in duration to the input pulse, is produced on terminal 603.

More specifically, there is shown in Fig. 15 a tube 604 having a control grid 605, a screen grid 606, a suppressor grid 607 and an anode 608. Control grid 605 receives an input pulse from terminal 601 through a parasitic suppressor 611, while the suppressor grid 607 receives a D.C. level signal from input terminal 602 through a parasitic suppressor 614. Screen grid 606 is biased at a positive potential of 90 volts from a source, not shown, connected to terminal 615, while the control grid 605 is biased at a negative potential of 15 volts by the source supplying the positive pulse. A negative voltage source, connected to control grid 605 through resistors 611 and 616, prevents vacuum tube 604 from conducting if the driving circuit, supplying the negative bias, should fail. Upon receiving the two positive inputs at terminals 601 and 602, the gate tube operates as a conventional coincidence circuit and conducts, thereby producing a voltage across a primary winding 618 of output transformer 620. A voltage pulse, induced in the secondary winding 619 of transformer 620, is applied across resistor 624 at output terminals 603 and 623.

The resistor and capacitor combinations of 625 and 626, 627 and 628, 615 and 630 comprise decoupling networks associated with the anode circuit, the output circuit, and the screen grid circuit respectively. Resistor 624 is a transformer terminating resistor providing damping for the output transformer 620. Positive anode potential is supplied by a source, not shown, through resistor 625.

Referring now to Fig. 16, there is illustrated therein in block schematic form one of the two digital-to-analog decoders 60 and 61 (Fig. 1) which are employed to convert a coded input signal into a deflection potential varying in amplitude as a function of a binary coded address. The X digital-to-analog decoder 60, herein described, is identical to the Y decoder, and the ensuing description will suffice for an understanding of both. Digital-to-analog decoders as such are well-known in the digital computer art, and the embodiment, herein illustrated, is shown merely by way of example.

A digital-to-analog converter or decoder is a device which converts a quantity represented by a set of binary digits into an analog quantity, the analog quantity in the present apparatus being an electrical voltage used as a deflection potential to position the CRT beam in accordance with a predetermined code.

The decoder illustrated in Fig. 16 is a binary weighted decoding circuit, the binary weighting being accomplished by means of a resistance ladder network to which a set of constant current sources are connected. The digital-to-analog decoder herein described utilizes three conversion channels, since a 3 bit binary code is employed to identify the X and Y coordinate addresses. Thus the resistance ladder network may be considered as comprising three interconnected sections, each section having a separate input from an associated constant current source. The digital-to-analog decoder also requires means for switching the constant current source on and off, and means for maintaining the constant current sources for as long as the output current is desired. This requires that some holding or storage device be used in conjunction with each constant current source to maintain the output current in either of two stable positions, depending on whether it is On or Off.

Each of flip-flops 701, 702 and 703, operate as holding or storage devices to maintain their associated output potentials at one of two stable levels, the output potentials being applied to conductors 704, 705 and 706, respectively. These flip-flops are of the type illustrated in and described in detail with respect to Fig. 14, utilizing the complement input described therein. Reference is made to the preceding discussion for the operation known as complementing the flip-flop. The input signals are applied to the flip-flops through conductors $X_0$, $X_1$ and $X_2$, which reverse the conduction states of the flip-flops when positive pulses are applied. In accordance with the logic employed in the subject apparatus, a positive pulse from the coding network indicates a binary "1," while the absence of a pulse indicates a binary "0." Thus the conduction state of the flip-flop is reversed each time a "1" signal is received.

Cathode followers, shown as 707, 708 and 709 provide the constant current source for inputs to the resistance ladder network. Output conductor 704 of flip-flop 701 is connected to control grid 711 of cathode follower 707 through a voltage divider comprising resistors 712 and 713 and parasitic suppressor 714. Capacitor 715, bridged across resistor 712, is a compensating capacitor which allows a sharp rise of the input voltage to the cathode follower. The purpose of the voltage divider circuit is to raise the D.C. output level of the flip-flop, which may be, for example, +10 or −30 volts before the output level is applied to the associated cathode follower. A higher output level is required from the flip-flop to obtain sufficient current at cathode 716 of cathode follower 707 to produce the required weighted potential level across output on conductor 64. Flip-flops 702 and 703 are connected through output conductors 705 and 706 and associated voltage divider networks to control grid 718 and 719 of cathode follower circuits 708 and 709 respectively. The voltage divider networks associated with cathode follower circuits 708 and 709 are identical in function and value to the network associated with cathode follower circuit 707. Since the flip-flop circuits 701 through 703 are also identical, the amplitude of the signals applied to control grids 711, 718 and 719 of cathode follower circuits 707 through 709 are identical for the On conditions of flip-flops 701—703.

The binary weighting resistance ladder network operates in the following manner. Resistors 721 through 724 are identical in value, which may be, for example, 1.1K ohms, while resistor 725 is twice that value, or 2.2K ohms. The current through resistors 726, 727 and 728 are of equal amplitude since they operate into equivalent load resistances of equal value.

The current flow through resistor 721 originating from cathode follower circuit 707 produces a potential on output conductor 64 equal to twice and four times the magnitude of the potential on output conductor 64 produced by current originating from cathode follower circuits 708 and 709 respectively. Thus it is seen that a binary weighting occurs, in which the potential outputs for output lines $X_0$, $X_1$ and $X_2$ are on a compartive order of magnitude of 4:2:1. Linearity of the output voltage is dependent both upon the correct value of the resistances in the ladder network and upon the constancy and equality of the current sources.

Upon completion of generation of a character, a "reset" pulse is applied on conductor 86 to reset flip-flops 701, 702 and 703 to the "0" condition prior to generating the next character.

A large screen cathode ray tube display requires magnetic deflection to obtain small spot size at high luminescence with a cathode-ray tube of reasonable length. However, the time constant of the deflection coil imposes a basic limitation on the rate at which the display can be generated. Also for rapid deflection of the beam, it is necessary to maintain a fairly large voltage across the coil so that the rate of change of current can be rapid. Thus, the exclusive use of magnetic deflection is undesirable both in terms of required driving power and speed limitation.

To overcome this difficulty, in cases where both a large screen display and high speed are desired, a cathode ray tube having a small range electrostatic deflection coupled with a large range magnetic deflection may be employed. The electrostatic deflection permits deflection of the beam over a fraction of the diameter of the screen of the CRT before limiting occurs due to the electron beam striking the neck of the tube. This deflection area can then be positioned at any point on the face of the CRT by the magnetic deflection. Thus, the slower magnetic deflection may be employed only to select the general area for display, while the electrostatic deflection is sufficiently rapid to be employed for character generation. Where smaller cathode ray tubes are employed, a variety of tubes having only electrostatic deflection are available to suit most applications.

The foregoing description of the operation of the system has been limited to synchronous operation, i.e., a ring cycle having twenty stages is employed irrespective of the number of spots required to define the selected characters. In order to achieve maximum speed of generating characters by the spot sequential method, it is necessary to make use of the fact that different characters required different numbers of spots to define them. The method of generating characters by terminating operation of the ring circuit as soon as sufficient spots are produced to define the selected character will be hereinafter referred to as asynchronous operation. For example, with a 7 x 5 matrix of spots, only seven spots are required to define a "1," fourteen spots to define a "2," eleven spots to define a "7," etc. For the decimal numerals 0 through 9, the average number of spots required to define each numeral is fourteen. In generating decimal numerals at a spot sequence rate of 500 kc., for example, forty microseconds are required per numeral if the ring is allowed a full cycle of 20 stages per character. However, by the asynchronous method, an average of only twenty-eight microseconds per numeral is required, resulting in an average saving of twelve microseconds per character generated. By modifying the character generator to asynchronous operation, an average saving in time of 30% per character generated as compared to the synchronous method of operation may be obtained. Modifications to change from synchronous to asynchronous operation are believed evident from an understanding of the operation of the system illustrated in Fig. 1.

While a ring operating speed of 500 kc. has been employed throughout the description as illustrative of the principle of the apparatus, a ring operating speed of one megacycle could be employed with minor circuit modifications, thereby doubling the effective speed of operation of the apparatus herein described.

While there has been shown and described and pointed out the fundamental novel features of the invention as applied to a plurality of embodiments, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. An electronic circuit for character synthesis wherein a character is incrementally generated on the screen of a cathode ray tube as a continuous sequence of spots comprising a plurality of control conductors equal to the number of spots required to define the character to be synthesized, means for applying a signal to each of said conductors in sequence, means responsive to the presence of said signals on each of said conductors for producing a first and a second series of control signals and means for converting said first and second series of control signals to a third and fourth series of potentials, varying in amplitude as a function of the addresses which define said spots.

2. In an electronic circuit for character synthesis, the subcombination comprising means for producing in a predetermined sequence a first plurality of deflection signals equal in number to the number of coordinate intersections required to define a selected character, means for producing a second plurality of deflection signals equal in number to and in synchronism with said first plurality of deflection signals, the magnitudes of said first and second deflection signals varying as functions of the magnitudes of the associated coordinates which define the positions of said series of spots which, when integrated, forms the character, a cathode ray tube having beam deflecting means and means to apply said first and second deflection signals to said beam deflecting means so as to resolve a character incrementally by causing said beam to move from spot to spot in synchronism with said first and second deflection signals.

3. In an electronic circuit for character synthesis, the subcombination comprising means for producing a plurality of first deflection signals varying in magnitude as a function of a plurality of first predetermined addresses which define a first set of coordinates required to generate a selected character, means for producing a plurality of second deflection signals varying in magnitude as a function of a plurality of second predetermined addresses which define a second set of coordinates required to generate said selected character, said first and said second plurality of deflection signals being produced in synchronism with and equal in number to the number of coordinate intersections required to define said selected character, a cathode ray tube having beam deflecting means and means for applying said first and said second plurality of deflection signals to said beam deflecting means so that the resulting spots generated thereby are incrementally resolved into a character.

4. An electronic circuit for character synthesis including a cathode ray tube having beam forming means, beam deflecting means and a screen, said electronic circuit comprising a plurality of conductors equal to the number of coordinate positions required to define the character to be synthesized, means for causing a signal to be applied to each of said conductors in succession, means responsive to the presence of said signals on each of said conductors for producing a first and a second series of synchronous control signals varying in amplitude in accordance with a predetermined code, means for converting said first and second series of control signals into a third and fourth series of signals varying as the coded address values which define the spots comprising said character, and means for applying said third and fourth series of synchronous potentials to said beam deflecting means whereby said beam is caused to move in synchronism with said coded address signals to thereby generate a character in incremental fashion.

5. An electronic circuit for character synthesis wherein a character is generated as a plurality of spots, each of said spots consisting of an intersection of an X and a Y coordinate, each of said coordinates being defined by a coded address, comprising in combination, a time pulse distributor including a plurality of output conductors corresponding to the number of spots which define the character to be synthesized, means to cause said time pulse distributor to deliver a pulse to said output conductors in sequence, coding means including said plurality of output conductors for producing a first and a second series of control pulses in accordance with a predetermined code, said coding means further including an individual circuit for each character to be synthesized and decoding means for converting said first and said second series of sequentially related signals to a third and fourth series of synchronized signals varying in amplitude as a function of the coded addresses which define the coordinate intersections comprising said character.

6. A device of the character described in claim 5 wherein said coding means comprises a diode network, said network including a separate array of diodes for each character to be synthesized, each of said arrays serving to produce a series of binary coded control signals in accordance with a predetermined code.

7. A device of the type described in claim 5 wherein said coding means comprises a network of magnetic core circuits, each of said circuits representing a separate character available for synthesis.

8. A device of the type described in claim 5, wherein said network of magnetic core circuits comprises an array of magnetic cores arranged in rows and columns, each row representing a separate character available for synthesis and containing an individual magnetic core for each spot which defines the associated character.

9. A device of the type described in claim 5, wherein said network of magnetic core circuits comprises a plurality of magnetic cores having generally rectangular hysteresis characteristics arrayed in rows and columns, each row comprising an individual circuit for an associated character, each circuit including means for setting the cores in its associated row to a predetermined state of magnetization.

10. A device of the character described in claim 5, wherein said network of magnetic core circuits comprises a single row of magnetic cores and wherein the individual circuits for the associated characters consist of a plurality of signal conductors threaded through said single row of magnetic cores according to a predetermined code.

11. An electronic circuit for character synthesis wherein a character is incrementally generated by an electron beam moving from spot-to-spot in a predetermined sequence, each of said spots comprising an intersection of an X and Y coordinate, and each of said coordinates being defined by a coded address signal, comprising in combination, signal generating means for producing a first and second series of signals varying in amplitude in accordance with a predetermined code, a selection network for determining the character to be synthesized, said network including an individual conductor for each character capable of synthesis, the selected one of said conductors serving to control the output from said signal generating means and means for converting said first and second series of signals into a third and fourth series of signals, said latter series of signals varying as a function of said coded address signals which define the coordinate intersections comprising said character.

12. In an electronic circuit for character synthesis, the subcombination comprising means responsive to a coded input signal for selectively applying a predetermined potential to one of a plurality of output conductors, each of said output conductors representing a separate character available for synthesis and having an associated circuit, means including said one conductor and its associated circuit for generating a plurality of sequentially related signals corresponding to the coordinate intersections required to define the character to be synthesized, and means for converting said plurality of signals into a first and second series of synchronous control potentials corresponding in time sequence to said generated plurality of sequentially related signals and varying in magnitude as functions of a first and a second address which define said coordinate intersections.

13. An electronic circuit for character synthesis comprising a cathode ray tube having beam forming means, beam deflecting means and a screen, a selection network responsive to a coded input signal for selectively applying a predetermined voltage to one of a plurality of conductors, each of said conductors representing a separate character available for synthesis, a coding network including said selected conductor for producing a plurality of groups of sequentially related signals corresponding in number to the number of coordinate intersections required to define the selected character and varying in amplitude in accordance with a predetermined code, means for decoding said plurality of groups of signals to a plurality of synchronous signals varying as a function of said plurality of groups of signals and means for applying said plurality of decoded synchronous signals to the beam of said cathode ray tube whereby said beam forming means is caused to move from spot-to-spot in predetermined sequence to thereby generate a character in incremental fashion, said spots corresponding to said coordinate intersections.

14. An electronic circuit for character synthesis including a cathode ray tube having beam forming means, beam deflecting means and a screen comprising in combination a time pulse distributor having a plurality of output conductors, said distributor comprising a multistage ring circuit for applying a pulse to each output conductor in succession, a selection network responsive to a coded input signal for applying a predetermined voltage to one of a plurality of conductors, said conductors representing the characters available for synthesis, a coding network having an individual circuit for each character, each of said individual circuits being controlled by the output conductors of said selection network, said coding network modifying the output of said time pulse distributor to produce a first and second series of synchronous control signals varying in amplitude in accordance with a predetermined code, means for converting the output from said coding network to a third and fourth series of deflection potentials varying in amplitude as a function of coded addresses which define the coordinates of the spots comprising said character and means for applying said deflection potentials to said beam deflecting means whereby said beam is caused to move from position to position on said screen in a predetermined sequence, thereby generating said selected character in incremental sequences.

15. A device of the character described in claim 14, wherein said coding network comprises a diode matrix so arranged as to produce a first and second series of binary coded control signals varying in accordance with a predetermined code, the presence of a diode in said network indicating a binary "1," the absence of a diode in said network indicating a binary "0" in said predetermined code.

16. A device of the character described in claim 14, wherein said coding network comprises a network of magnetic cores, said network so connected as to produce a first and second series of binary coded control signals varying in accordance with a predetermined code.

17. A device of the character described in claim 14, wherein said coding network comprises a plurality of magnetic cores arrayed in rows and columns, each row comprising one of said individual circuits and containing an associated bias driver, the number of rows in said coding network being equal to the number of characters available for synthesis, said coding network including conductors interwoven throughout said magnetic core coding network in accordance with a predetermined code so as to produce said first and second series of coded control signals.

18. A device of the character described in claim 14, wherein said coding network comprises a plurality of bistable magnetic cores of the type having a rectangular hysteresis loop arrayed in rows and columns, each row comprising an individual circuit for a corresponding character and containing an associated pulse current generator, said network further including a plurality of signal conductors interwoven throughout said magnetic cores so as to selectively produce said first and second series of synchronous control signals varying in amplitude in accordance with said predetermined code.

19. A device of the character described in claim 14, wherein said coding network comprises a single row of magnetic cores, and wherein said individual circuits for associated characters comprise a separate group of signal conductors threaded throughout said row of cores, each of said groups threaded in accordance with a predetermined code and functioning when energized to produce said first and second series of control signals.

20. An electronic circuit for character synthesis including a cathode ray tube having beam forming means, beam deflecting means and a screen, a selection network responsive to a coded input signal for selectively applying a predetermined voltage to one of a plurality of output conductors, each of said conductors representing a separate character available for synthesis, means for generating a series of sequentially related signals, a coding circuit including said one of said plurality of output conductors for translating said sequentially related signals into a first and second series of synchronous control signals, the number of signals in each step of said first and second series corresponding to the number of digits in the associated coded address, and the number of steps in each of said series corresponding to the number of coordinate positions required to define a character, means for converting said first and second series of control signals to first and second analog signals respectively, the amplitude of said analog signals varying as a function of the coded addresses which define the coordinate intersections comprising said character and means for applying said first and second analog signals to said beam deflecting means whereby the cathode ray beam is caused to move from position to position on said screen in a predetermined sequence, thereby generating a character in incremental fashion.

21. An electronic apparatus for synthesizing a plurality of pre-selected characters for display, said characters being spatially arrayed on the screen of a cathode ray tube, said apparatus comprising a coding network having a plurality of coding circuits, one for each unique character to be displayed, a control conductor for each of said plurality of coding circuits, ring circuit means for energizing said coding network with a plurality of sequentially related groups of signals, each group including a sequentially related series of signals, the number of groups being equal to the number of characters to be spatially arrayed and the number of signals in each of said series of signals being equal to the number of spots required to synthesize said pre-selected characters, a character generator control circuit having a plurality of first output conductors, one for each horizontal position in which characters may be placed, a plurality of second output conductors, one for each vertical position in which characters may be placed, means for energizing a predetermined pair of said output conductors for each group of said plurality of sequentially related groups of signals, each of said predetermined pairs of said output conductors consisting of one of said plurality of first output conductors and one of said plurality of second output conductors, means responsive to the energization of each pair of said output conductors for producing character selection signals, means responsive to each of said character selection signals for selectively energizing one of said control conductors, each of said coding circuits producing a first and second series of synchronous coded signals in response to energization of its associated control conductor, means for converting said synchronous coded signals to a third and fourth series of deflection potentials varying in amplitude as a function of coded addresses which define spots of the selected character, means responsive to the energization of said plurality of first output conductors and said plurality of second output conductors for producing horizontal and vertical positioning potentials and means to apply said deflection potentials and said positioning potentials to the deflection system of a cathode ray tube.

References Cited in the file of this patent

UNITED STATES PATENTS

| 2,552,761 | Baker | May 15, 1951 |
| 2,553,170 | Bryce et al. | May 15, 1951 |
| 2,594,731 | Connolly | Apr. 29, 1952 |
| 2,679,035 | Daniels | May 18, 1954 |
| 2,736,770 | McNaney | Feb. 28, 1956 |
| 2,754,360 | Dersch | July 10, 1956 |
| 2,766,444 | Sheftelman | Oct. 9, 1956 |
| 2,784,251 | Young | Mar. 5, 1957 |

OTHER REFERENCES

"Static Magnetic Matrix Memory and Switching Circuit," by Jan Rajchman, RCA Review, June 1952, pp. 183–201.

"High Speed Magnetic-Core Output Printer," by Gordon and Nicola, Proc. of Assn. for Comp. Mach., September 1952, pages 6–12.

"High-Speed Number Generator Uses Magnetic Memory Matrices," by An Wang, Electronics, May 1953, pp. 200–204.

UNITED STATES PATENT OFFICE

CERTIFICATE OF CORRECTION

Patent No. 2,931,022            March 29, 1960

William E. Triest

It is hereby certified that error appears in the printed specification of the above numbered patent requiring correction and that the said Letters Patent should read as corrected below.

Column 12, line 49, for "decorder" read -- decoder --; column 15, line 55, for "curbe" read -- curve --; column 19, line 47, for "on" read -- to --; column 21, line 25, for "of", first occurrence, read -- on --; column 32, lines 33 and 34, for "the beam of said cathode ray tube whereby said beam forming means" read -- said beam deflecting means whereby the beam of said cathode ray tube --.

Signed and sealed this 15th day of November 1960.

(SEAL)
Attest:

KARL H. AXLINE                                        ROBERT C. WATSON
Attesting Officer                                Commissioner of Patents